United States Patent [19]

Back et al.

[11] Patent Number: 5,091,904
[45] Date of Patent: Feb. 25, 1992

[54] GENERAL SIGNALING SERVICE UNIT OF ELECTRONIC SWITCHING SYSTEM

[75] Inventors: Je I. Back; Deok H. Kim; Hyun H. Hong; Mun G. Kyong; Ju Y. Park; Hyeong H. Lee; Young K. Lee; Hang G. Park, all of Chungnam, Rep. of Korea

[73] Assignee: Korea Electronics and Telecommunications, Rep. of Korea

[21] Appl. No.: 469,231

[22] Filed: Jan. 24, 1990

Related U.S. Application Data

[63] Continuation of Ser. No. 280,341, Dec. 6, 1988, abandoned.

[30] Foreign Application Priority Data

Dec. 11, 1987 [KR] Rep. of Korea .................. 87-14187

[51] Int. Cl.$^5$ ............................................. H04J 3/12
[52] U.S. Cl. ................................................ 370/58.1
[58] Field of Search .................. 370/58.1, 58.2, 58.3, 370/110.1

[56] References Cited

U.S. PATENT DOCUMENTS

| | | | |
|---|---|---|---|
| 4,119,803 | 10/1978 | Jacob | 379/279 X |
| 4,146,749 | 3/1979 | Pepping et al. | 379/279 X |
| 4,493,076 | 1/1985 | Khimeche et al. | 371/11 |
| 4,710,952 | 12/1987 | Kobayashi | 379/269 |

OTHER PUBLICATIONS

T. Ueno, et al., "Speech Path Equipment of D60 and D70 DIgital Switching System", Review of the ECL, NTT, Jpn., vol. 33, No. 2, 1985.
K. Gotoh and H. Ikeda, "System Architecture of Digital Switching System D70(D) for INS: An Overview", ISS '84, 31A1, Florence, 1984.
J. C. Borum, et al., "Special Issue on the SESS Switching System", B.S.T.J., vol. 64, No. 6, Jul.-Aug. 1985.
J. H. Davis, et al., "No. 5 ESS System Architecture", ISS '81, 31A2, CIC Montreal, 1981.
AT&T Practice Standard, "Interface Module Description '5ESS Switch'", 235-100-101RK, Issue 1, Jun. 1984.
No. 5ESS Training Manual, "Functional Description Unit Interface Module Digital Service Unit (DSU)", NM-594, AT&T Technologies, 1985.
S. Shirasawa et al., "Signaling Equipments of D70 Digital Switching System", NEC Technical Journal, vol. 36, No. 3, Mar. 1983, pp. 26-30.

Primary Examiner—Douglas W. Olms
Assistant Examiner—Melvin Marcelo
Attorney, Agent, or Firm—Evenson, Wands, Edwards, Lenahan & McKeown

[57] ABSTRACT

Universal signaling service unit for providing such signal that required to connection and progress of calling in time-division electronic switching system. The invention, in constitution that TSU, TSP, ASTU, ASIP, DTIU, DTIP, FIU, FIP, USTU, LSIP, IPCB, ASP are made to cooperate together, is organized such that: PCM signal data are transmitted and received by the control via telephony device-bus TD-bus, fault status is informed via alarm bus, various service functions requiring real time process are commonized to make one universal signaling tranceiver assembly USTA, signaling service function in USTA is divided into signal tone transmitting and receiving mode service group, and standby mode service group, and USTU is divided into USTU 0 and USTU 1; wherein USTA block is organized with TD-bus interface block, control block, sending block, receiving block, SHW interface block, and messages of FIGS. 6a to 6g are exchanged between LSIP and USTA through TD-bus so that universal signal service unit is operated, and sequence of operational process within USTA is carried out in sequence of FIG. 8.

9 Claims, 17 Drawing Sheets

| D7 | D6 | D5 | D4 | D3 | D2 | D1 | D0 |

ACTION MODE INFORMATION

| D7 | D6 | D5 | D4 | ACTION MODE |
|----|----|----|----|-------------|
| 0 | 0 | 0 | 0 | AUDIBLE SIGNAL |
| 0 | 0 | 0 | 1 | " |
| 0 | 0 | 1 | 0 | " |
| 0 | 0 | 1 | 1 | " |
| 0 | 1 | 0 | 0 | R2 MFC FORWARD |
| 0 | 1 | 0 | 1 | R2 MFC BACKWARD |
| 0 | 1 | 1 | 0 | DTMF |
| 0 | 1 | 1 | 1 | CONTINUITY CHECKING TONE |
| 1 | 0 | 0 | 0 | NOT USED |
| 1 | 0 | 0 | 1 | " |
| 1 | 0 | 1 | 0 | " |
| 1 | 0 | 1 | 1 | " |
| 1 | 1 | 0 | 0 | TEST(R2 MFC FORWARD) |
| 1 | 1 | 0 | 1 | TEST(R2 MFC BACKWARD) |
| 1 | 1 | 1 | 0 | TEST (DTMF) |
| 1 | 1 | 1 | 1 | TEST(CONTINUITY CHECKING TONE) |

DIGIT INFORMATION

| ACTION MODE | DIGIT KINDS |
|-------------|-------------|
| R2 MFC | 0 ~ 15 |
| DTMF | 0 ~ 15 |
| CONTINUITY CHECKING TONE | 0 ~ 2 |
| AUDIBLE SIGNAL TONE | 0 ~ 2 |

FIG.6a

GENERAL SIGNALING SERVICE UNIT OF ELECTRONIC SWITCHING SYSTEM

This application is a continuation of U.S. Ser. No. 280,341, filed on Dec. 6, 1988, now abandoned, and based on Korean Patent Application 87-14187 filed in Korea on Dec. 11, 1987.

BACKGROUND OF THE INVENTION

The present invention relates to a general signaling service unit in time-division electronic switching system, and more particularly, to a general signaling service unit for providing a signal required to connection and progress of calling in electronic switching system.

Various signaling service functions for controlling the connection and progress of calling are used in variety among the service functions of electronic switching system, and signaling service unit for providing these signaling service functions is necessarily required to realize the essential function of electronic switching system which is connection of channel.

Among the signaling service functions of electronic switching system, there is transmitting and receiving function of R2 MFC (R2 multi-frequency compelled) signal used for the information exchange between telephone exchanges in channel associated signaling method in which signal is exchanged through relay line channel, and further receiving function of DTMF (dual tone multi-frequency) signal from push button telephone subscriber as well as transmitting junction of various audible signal tone for informing the connecting and progressing state of calling from switching system to telephone, are mainly handled, and in addition to these, transmitting and receiving function of CCT (continuity checking tone) for confirming whether or not it being normal with respect to the relay line channel between telephone exchanges is also used in accordance with the common channel signaling method being used in which signal exchange between telephone exchanges is executed through common exclusive signal channel separate from the relay line channel as a signaling method between telephone exchanges.

Signaling service unit executing respectively the functions of R2 MFC signal transmitting and receiving, DTMF signal transmitting and receiving, audible signal tone transmitting, and continuity checking tone transmitting and receiving which are used for processing of calling in electronic switching system, is normally provided by way of switch network to the subscriber's line or relay line, and in conventional electronic switching system (refer to following reference materials), in accordance with the kind of channel applied by each kind of signaling service, location serviced by multiplying and providing form of service, controlling method of signaling service unit, is constituted with respective forms and being complicated as a whole, and since signaling service unit is constituted with separated forms and being made of several kinds of circuit packs, occupying area of signaling service unit within the electronic switching system is increased and reliability is decreased, so that not only the maintenance and management are difficult but also there has been many disadvantages in view point of productivity and economism.

On the other hand, in accordance with the recent development of digital signal processing technique and semiconductor integrating circuit technique, digital signal processor chip DSP for digital signal processing only is developed, so that development of signaling service unit of high performance for generating and detecting the digital signal has become possible, and constitution of multi-function type signaling service unit for transmitting and receiving various kinds of signals by using DSP chip has also become possible.

List of Reference Materials

1) T. Ueno, et al., "Speech path equipment of D60 and D70 digital switching system", Review of the ECL, NTT, Jpn., vol. 33, no. 2, 1985.

2) K. Gotoh and H. Ikeda, "System architecture of digital switching system D70(D) for INS: an overview", ISS '84, 31A1, Florence, 1984.

3) S. Shirasawa, et al., "Signaling equipments of D70 digital switching system", NEC Technical journal, vol. 36, no. 3, March 1983.

4) J. C. Borum, et al., "Special issue on the SESS switching system", B.S.T.J., vol. 64 no. 6, July–Aug. 1985.

5) J. H. Davis, et al., "NO. 5 ESS system architecture", ISS '81, 31A2, CIC Montreal, 1981.

6) AT&T Practice Standard, "Interface module description '5ESS switch'", 235-100-101RK, Issue 1, Jun. 1984.

7) NO. 5ESS Training Manual, "Functional description unit interface module digital service unit (DSU)", NM-594, AT&T Technologies, 1985.

OBJECT AND SUMMARY OF THE INVENTION

Therefore, the present invention is invented to improve such disadvantages causing from the constitutional form of said signaling service unit, and it is an object of the present invention to provide general signaling service unit of electronic switching system in which the functions requiring real time service such as generation and detection and the like of signal by each kinds of signaling services with respect to R2 MFC signal, DTMF signal, audible signal tone and continuity checking tone structured by respective signaling service units in response to whether or not the servicing subjet being either subscriber's line or relay line in the electronic switching system are made in common and designing into one kind of general signal transmitting and receiving circuit pack, and these circuit packs are concentrated to one place and constituting general type signaling service unit, so that signaling service function can be efficiently provided within the electronic switching system.

According to the present invention, the functions requiring real time service such as generation and detection and the like of signal by each kinds of signaling services with respect to R2 MFC signal, DTMF signal, audible signal tone and continuity checking tone composed of respective signaling service units in response to whether or not the servicing subject being either subscriber's line or relay line in the electronic switching system, are made in common and being designed to one kind of general type signal transmitting and receiving circuit pack. Interface function with control unit and switch network is made within general signal transmitting and receiving circuit pack so that transmitting and receiving function of pulse code modulation PCM can be executed with switch network while general signal transmitting and receiving circuit pack is controlled by the control unit, and services of transmitting and receiving with respect to R2 MFC signal, DTMF signal, continuity checking tone and audible signal tone are made possible to provide all by the general signal transmitting and receiving circuit pack, and according to these, the general signal transmitting and receiving circuit pack is made possible to operate with three kinds of function mode service groups in response to the feature of signaling service function, wherein these are signal tone transmitting and receiving mode service group for executing transmitting and receiving the functions of R2 MFC signal, DTMF signal and continuity tone, audible signal tone transmitting mode service group for providing audible signal tone, and standby mode service group being in standby of executing the function in case of packing spare circuit packs for the continuous providing of signaling service etc. General type signaling service unit is constituted by dividing into two units for the extention of signaling service capacity and improvement of reliability, and one switch network doubled by respective signaling service units is connected with separate PCM signal subhighway SHW, and being connected with two control units and controlled by exclusive control unit and made to execute the service function. General signal transmitting and receiving circuit packs in which the functions are respectively defined with signal tone transmitting and receiving mode service group, audible signal tone transmitting mode service group, and standby mode service group controlled by the exclusive control unit in case of normal operation, are constituted within each signaling service units, wherein the general signal transmitting and receiving circuit pack detined to the signal tone transmitting and receiving mode service group is constituted with structure of loaded and diverged by dividing the whole signaling service capacity into two units, the general signal transmitting and receiving circuit pack defined to the audible signal tone transmitting mode service group is constituted by one to each signaling service unit by doubling, and the general signal transmitting and receiving circuit pack defined to the standby mode service group is constituted with N+1 redundancy structure to each signaling service unit. Therefore, when one control unit of two control units is failed, remaining other control unit controls both of two singaling service unit, and when damage is occurred by per unit of the general signal transmitting and receiving circuit pack, regardless of service function that has been executing, continuous service is provided because the general signal transmitting circuit pack defined to the standby mode service group executes the service function vicariously by receiving the operation mode service group defining information from the control unit, at this moment, when the general signal transmitting and receiving circuit pack occurred with fail is returned to the normal, returned general signal transmitting and receiving circuit pack operates with the standby mode service group. And when one of two signaling service units is failed, only the service processing capacity of the general signal transmitting and receiving circuit pack defined with the signal tone transmitting and receiving mode service group provides continuous service at reduced state.

According to the present invention, in contrast with the conventional electronic switching system having such points as either the signaling service unit is divided per signaling service kinds, or constituted with several kinds of circuit packs or else the control system is complicated, general type signaling service unit is constituted by applying with only one kind of general signal transmitting and receiving circuit pack and centralizing to one place, so that control system of signaling service unit becomes simplified and miniaturized, and occupying area that the signaling service unit occupies in the switching system is reduced, production cost is reduced and productivity and economism are improved, and maintenance, repairing, and management are simple and easy whereby efficiency is maximized. Further, there is effect for optimizing automatically the signaling service capacity without requiring to calculate separate signaling service capacity per signaling service kinds. Furthermore, since it is constituted by one kind of circuit pack, packing location of circuit pack within signaling service unit is not required to designate, and since standby circuit pack for subjecting all circuit pack within signaling service unit is used, and structure mixed with load disperion and doubling in response to the signaling service function is realized, reliability is enhanced. In addition, since it can be utilized to all of telephone exchanges for local, tandem and toll without changing the structure of signaling service unit, and corresponding signaling service function can be executed by changing the circuit pack numbers of required capacity in response to the signal traffic of telephone exchange, provision for effective signaling service is possible, and it is possible to meet with adaptability for the tendency that switching system is becoming to be larger capacity and accommodating capacity is becoming to be dispersion module in future.

The foregoing and other objects as well as advantages of the present invention will become clear by following of the invention with reference to the accompanying drawings.

BRIEF DESCRIPTION OF THE DRAWINGS

For a better understanding of the invention, and to show how the same may be carried out into effect, reference will now be made, by way of example, with respect to the accompanying drawings, in which:

FIGS. 6a, 6b, 6c, 6d, 6e, 6f, and 6g are formats showing structure of message being exchanged between control unit and general signal transmitting and receiving circuit pack.

Throughout the drawings, like reference numerals and symbols are used for desingnating like or equivalent parts or portions, for simplicity of illustration and explanation.

DETAILED DESCRIPTION OF THE PREFERRED EMBODIMENT

Hereinafter, a preferred embodiment of the present invention will be described in detail with reference to the accompanying drawings.

Figure 1:
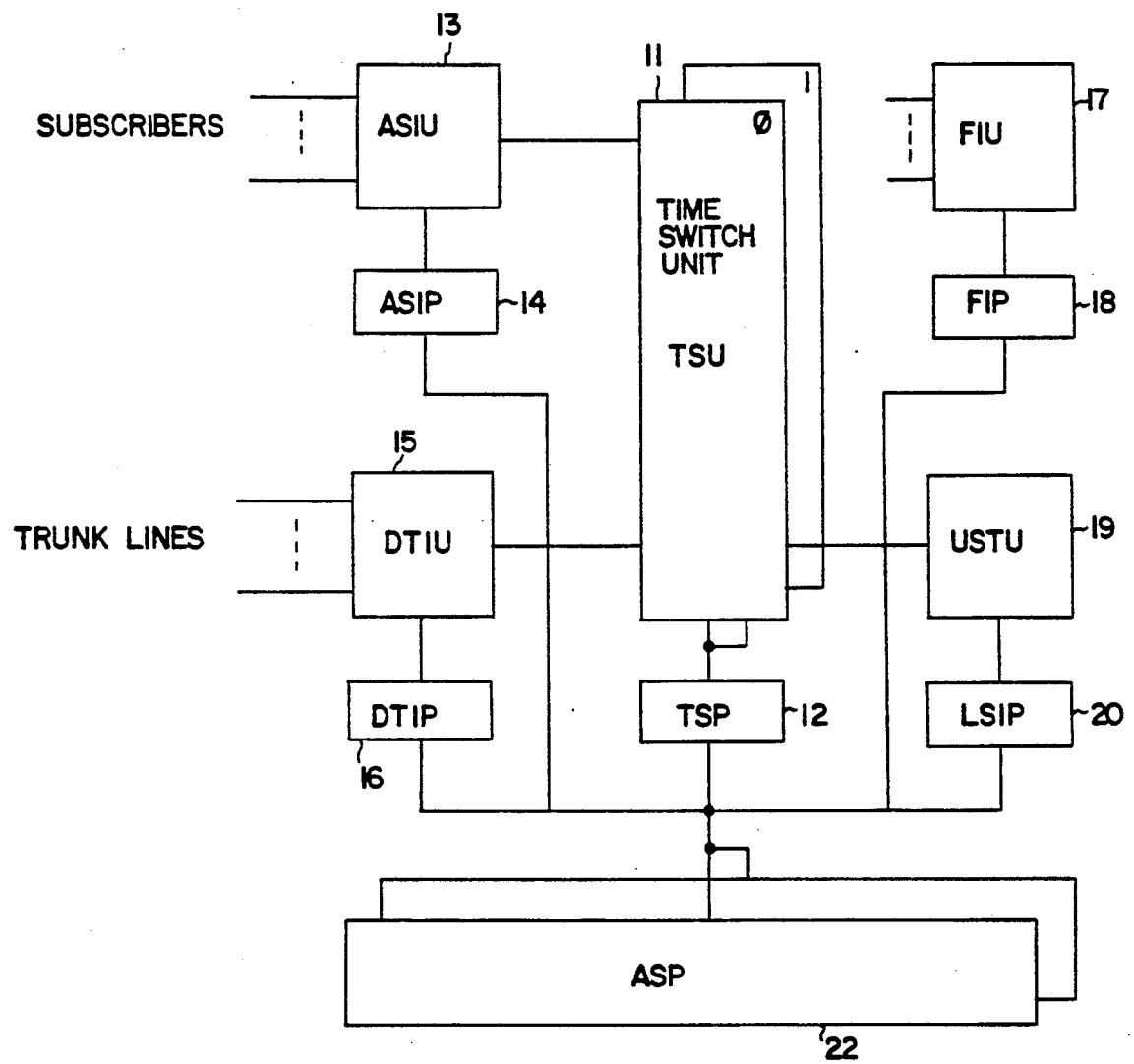
FIG. 1 is a block diagram showing structure of time division electronic switching system in which the present invention is applied.

FIG. 1 is a block diagram showing structure of time division electronic switching system applied with the present invention, which is constituted as follows. That is, time switch unit TSU 11 which is doubled switch network and time switch processor TSP 12 for controlling TSU 11, analog subscriber interface unit ASIU 13 for connecting subscriber and analog subscriber interface processor ASIP 14 for controlling ASIU 13, digital trunk interface unit DTIU 15 for connecting relay line between telephone exchanges and digital trunk interface processor DTIP 16 for controlling DTIU 15, fault interface unit FLU 17 for collecting and processing fault for maintaining and repairing function within switching system and fault interface processor FIP 18 for controlling FIU 17, universal signaling tranceiver unit USTU 19 for executing various signaling service function required to process of calling and local service interface processor LSIP 20 for controlling USTU 19, and accessing switching processor ASP 22 for controlling and managing all processors described previously for controlling various functions within electronic switching system through inter-processor control bus IPCB 21 are coorperated together.

Figure 2:
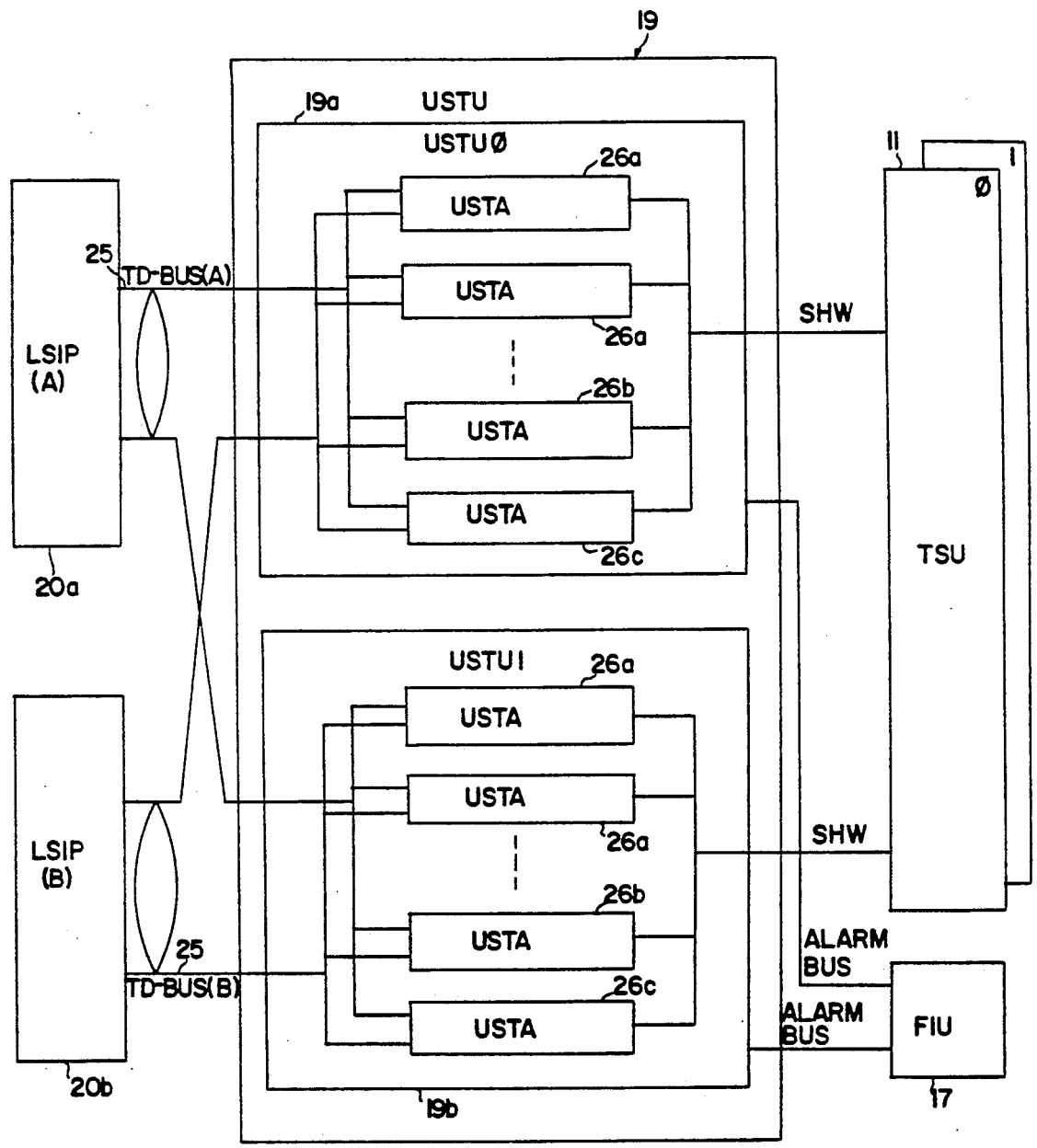
FIG. 2 is a block diagram showing structure of general type signaling service unit of the present invention.

FIG. 2 is a block diagram showing structure of universal signaling tranceiver unit of the present invention, whose structure of unit, providing form of service and feature of unit will be described as follows. Pulse code madulation PCM signal data of corresponding signal are transmitted and received by transmission speed of 2.5M bps (mega bits per second) through subhighway time switch unit TSU 11 by receiving directly the control of local service interface processor LSIp 20 through telephony device-bus TD-bus 25 composed of serial method of one byte data unit, and fault state produced in case when function is failed at universal signaling tranceiver unit USTU 19 is informed to fault interface unit FIU 17 through alarm bus. In order to generalize the circuit pack consisting of USTU 19 to one kind, service function requiring real time process such as function for sending to TSU 11 by generating a signal by signaling service function with respect to R2 MFC signal DTMF signal, continuity checking signal tone and audible signal tone and function for detecting the signal received from TSU 11 is made in common and being designed to one universal signaling tranceiver assembly USTA 26. Circuit is constituted within USTA 26 so as to execute interface with TD-bus 25 and PCM signal SHW in order to execute transmitting and receiving the signal with TSU 11 by receiving the control from LSIP 20, and being made possible to execute all services of transmitting and receiving function with respect to R2 MFC signal, DTMF signal, continuity checking signal tone and audible signal tone, and own checking of transmitting and receiving loop-back within USTA 26 is possible with regard to all signaling service function except audible signal tone by using USTA 26 providing transmitting and receiving function of signaling as these, since checking result is possible to obtain easily, maintenance and repairing are easy, and since checking result and form of audible signal tone are possible to change only with control by LSIP 20, veratility is improved and operation is easy and simple.

According to this, signaling service function of USTA 26 is, in accordance with feature of signal and providing form of service and executing process of service by signaling service kind, classified to signal tone transmitting and receiving mode service group 26a for providing R2 MFC signal, DTMF signal and continuity checking tone requiring the transmitting and receiving function of signal and audible signal tone transmitting mode service group 26b for providing audible signal tone requiring only transmitting function of signal, and in case of packing extra circuit packs for providing continuously the signaling service to this, standby mode service group 26c standing by the execution of function is added. In accordance with USTA 26 comprised of three groups of function mode service group being used, USTU 19 is made to the structure comprised of respective USTA 26 conforming the three groups of function mode, and USTU 19 is constituted by dividing two units of USTU 019a and USTU 1 19b for extention of signaling service capacity and improvement of reliability and that each USTU 0 19a and USTU 1 19b connect doubled one TSU 11 and separate PCM signal SHW, and being connected to two LSIP 20a, 20b and TD-bus 25 and being made to execute service function by receiving the control from exclusive LSIP 20a, 20b of two LSIP 20a, 20b. Each USTU 0 and USTU 1 are constituted with USTA 26 in which the functions are defined respectively to signal tone transmitting and receiving mode service group 26a receiving the control from exclusive LSIP 20 in the time of normal operation, audible signal tone transmitting mode service group 26b and standby mode service group 26c, USTA 26a defined to the signal tone transmitting and receiving mode service group 26a is constituted with such structure that whole signaling service capacity is divided to each of USTU 0 19a and USTU 1 19b whereby the loads being dispersed, USTA 26b defined to the audible signal tone transmitting mode service group 26b is constituted by one to each USTU 0 19a and USTU 1 19b by doubling because there is direct influence to the service quality since response of switching system is directly transferred to subscriber by utilizing the signal tone, USTA 26c defined to the standby mode service group 26c is constituted with each USTU 0 19a and USTU 1 19b with N+1 redundancy. therefore, when one LSIP (a) 20a of two LSIP 20a, 20b is failed, remaining another LSIP (B) 20b controls both of USTU 0 19a and USTU 1 19b and signaling service function can be continued, when damage is arisen by USTA 26 unit, regardless of service function during executing, USTA 26c defined to the standby mode service group 26c receives the information defining the operation mode service group from LSIP 20 and executing the service function vicariously whereby continuous service can be provided, at this moment, when USTA 26 arisen with fail is returned to normal, returned USTA 26 operates as the standby mode service group. Further, when one of two USTU 0 19a and USTU 1 19b is failed, continuous service can be provided in a state that only service processing capacity of USTA 26a defined to the signal tone transmitting and receiving mode service group 26a being reduced.

Figure 3:
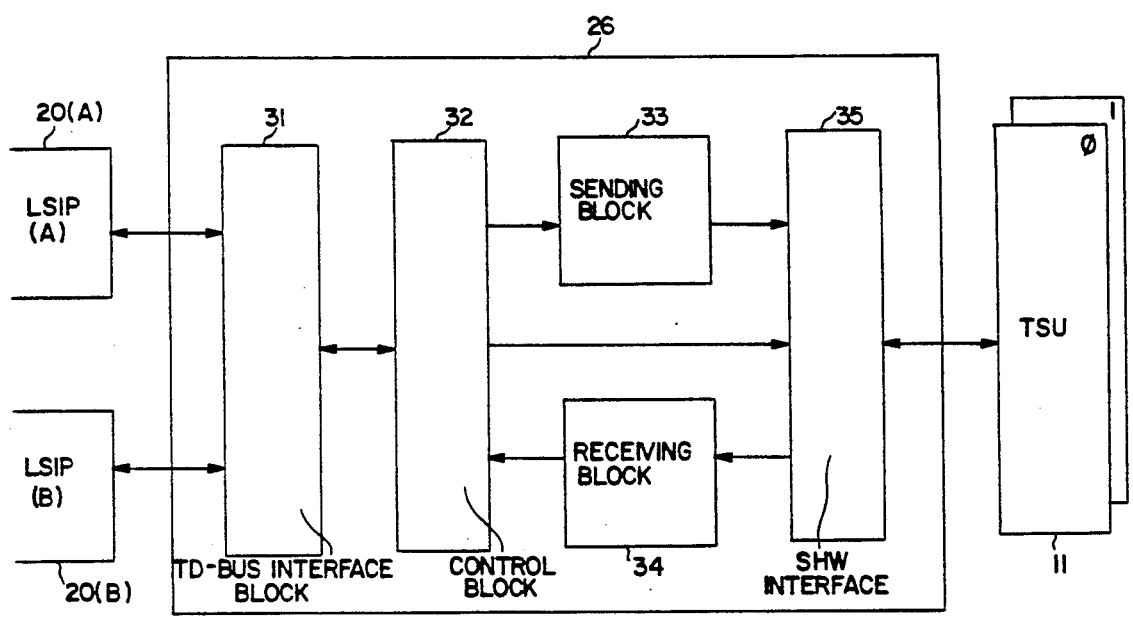
FIG. 3 is a block diagram showing structure of general signal transmitting and receiving circuit pack constituting signaling service unit of the present invention.

FIG. 3 is a block diagram showing structure of USTA 26 constituting USTU 19, which is designed with generally 5 blocks, whose 5 blocks are TD-bus interface block 31, control block 32, sending block 33, receiving block 34, and SHW interface block 35 etc. TD-bus interface block 31 is connected with two TD-buses 25 and executing the function of communicating with LSIP 20 selecting one of two TD-buses 25, control block 32 is a block executing the function for controlling effectively all signaling service functions within USTA 26 wherein reading various information received from LSIP 20 from TD-bus interface block 31 and controlling transmitting and receiving functions of signal within USTA 26, sending block 33 executes the function of general PCM signal data defined by each CH (channels) in response to the signal information received from the control block 32 and sending to the SHW interface block 35, and receiving block 34 executes the function of selecting the function mode corresponding to R2 MFC signal and DTMF signal as well as continuity checking tone having the receiving function of signal among various signaling service functions in response to the control of the control block 32 and receiving and detecting the serial data of signal information made to PCM inputted from TSU 11 through SHW interface block 35 and then informing to the control block 32. And, SHW interface block 35 is connected with SHW used for the transmitting and receiving of PCM signal data with TSU 11, wherein executing the function of selecting the corresponding SHW among several SHWs in response to the control of the control block 32, and sending the signal date sent from the sending block 33 to TSU 11, executing the function of sending the signal data received from TSU 11 to the receiving block 34, and looping-back the PCM data transmitted by CH from the sending block 33 to the receiving block 34 within the USTA 26 by receiving the control of the control block 32.

Figure 4:
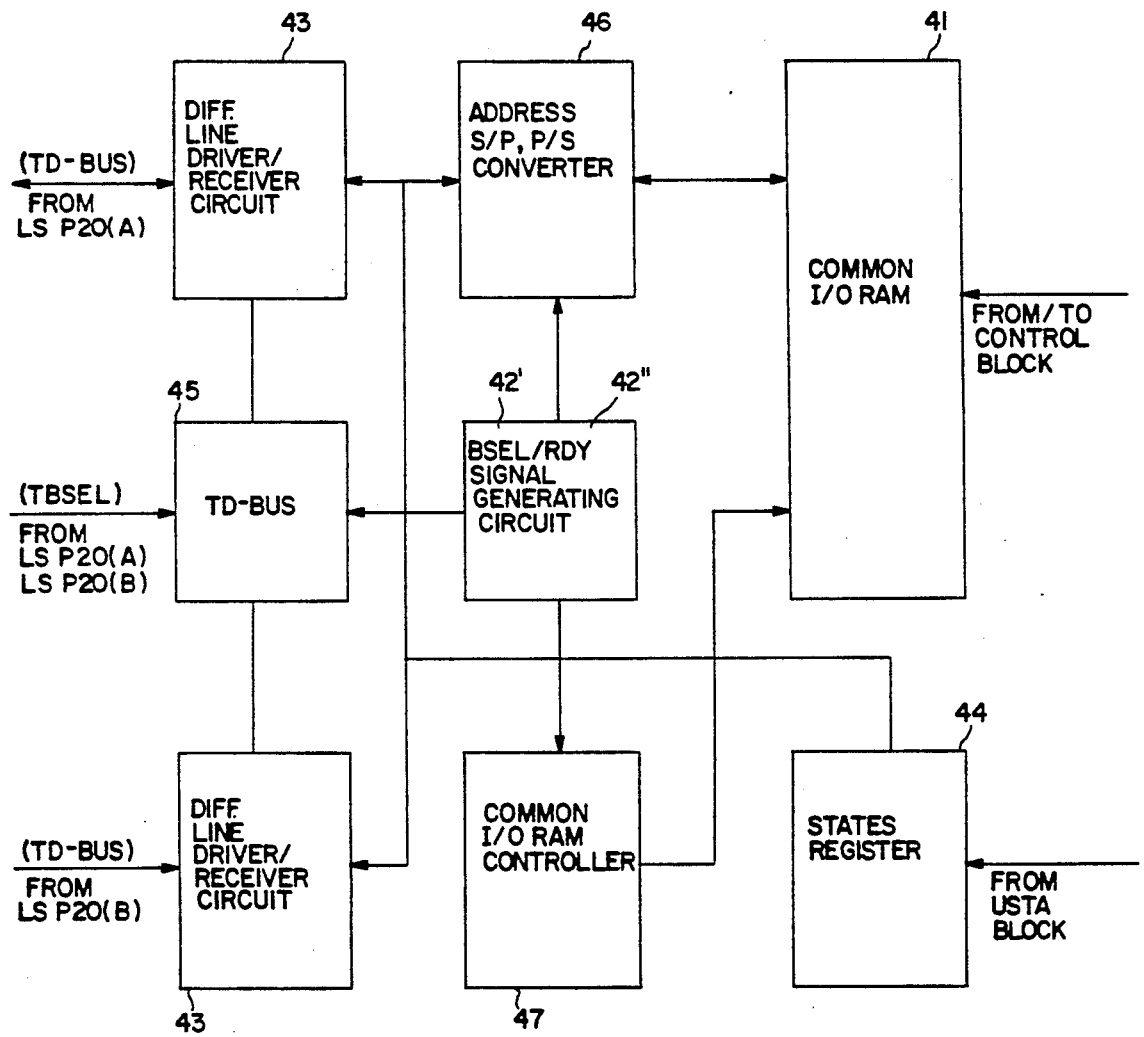
FIG. 4 is a block diagram showing hardware structure of TD-bus interface block within general signal transmitting and receiving circuit pack.

FIG. 4 is a block diagram showing structure of hardware of TD-bus interface block 31 within USTA 26, TD-bus selector 45 constitutes such that TD-bus interface block 31 circuit configuration selects one TD-bus 25 by utilizing TBSEL (TD-bus selection) signal sent from both LSIPs 20s among two TD-buses 25 connected respectively to LSIP(A) 20a and LSIP(B) 20-b, and address S/P, P/S converter 46 converts (S/P conversion) various data informations inputted from LSIP 20 from serial form to parallel form and writing to common Io ram (input/output random access memory) 41 controlled lby common I/P RAM controller 47 and making to be able to utilize within USTA 26, and the circuit of converting (P/S conversion) the data information processed to parallel form within USTA 26 into serial form and sending to LSIP 20 is constituted. And further, there are BSEL (board selection) circuit 42' used for the communication with LSIP 20 and RDY (ready) signal generating circuit 42", and differential line driver/receiver circuit 43 is used for the stable interface of TD-bus 45. And further more other than these, status register (44) capable of knowing the operating condition within USTA 26 is included, and collecting the fault and alarm state generated from each block within USTA 26.

Figure 5:
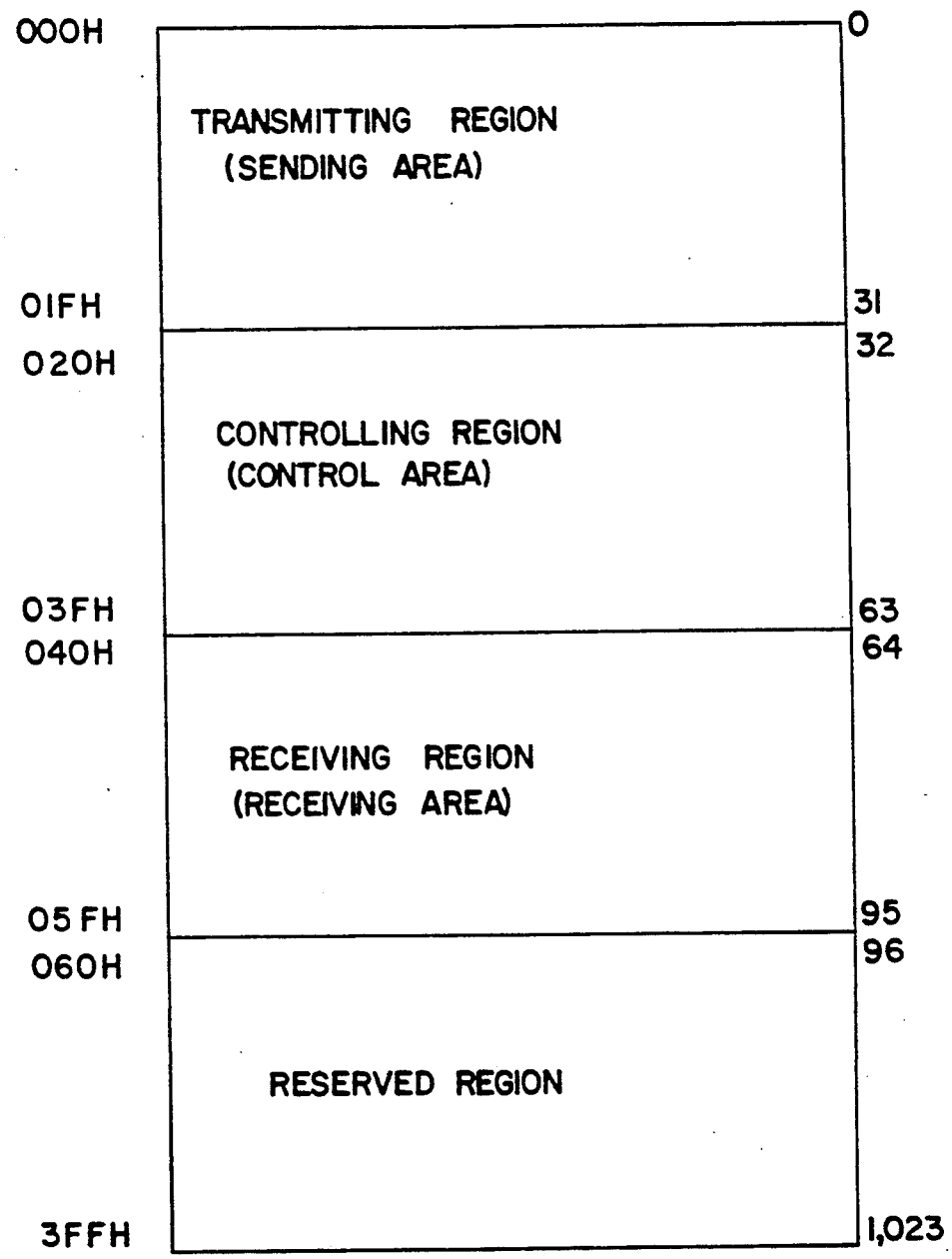
FIG. 5 is a diagram of memory map of common I/O RAM of general signal transmitting and receiving circuit pack.

FIG. 5 is memory map of common I/O RAM within USTA 26, wherein commercially obtainable AMD 2131-3 dual port RAM of 1024 byte is used, and being constituted with transmitting region, controlling region, receiving region and reserved region. The transmitting region, controlling region and receiving region are separated by 32 bytes unit, wherein the transmitting region is a region used for sending the message from LSIP 20 to USTA 26, controlling region is a region used for exchanging each other various controlling messages between LSIP 21 and USTA 26, and receiving region is a region used for reading the result executed at USTA 26 from LSIP 20.

FIGS., 6a, 6b, 6c, 6d, 6e, 6f and 6g are formats of messages exchanged through TD-bus between LSIP 20 and USTA 26. FIG. 6a is a format of message used in transmitting region, which is used for sending various control information message from LSIP 20 to USTA 26, and DO–D3 bits represent the information to send, and in case of R2 MFC signal and DTMF signal, exhibiting the dagits of 0–15, in case of the continuity checking tone, exhibiting the information of 0–2, and in case of the audible signal tone, exhibiting that kind of cadence is three kinds. Here, the change of cadence is carried out by unit of USTA 26, and only 1 byte of OOH address is used. D4–D7 bits exhibit the action mode information such as R2 MFC signal, DTMF signal and continuity checking tone by CH, in case when D7 bit is set, loop-back test within USTA 26 is meant.

Figure 6B:
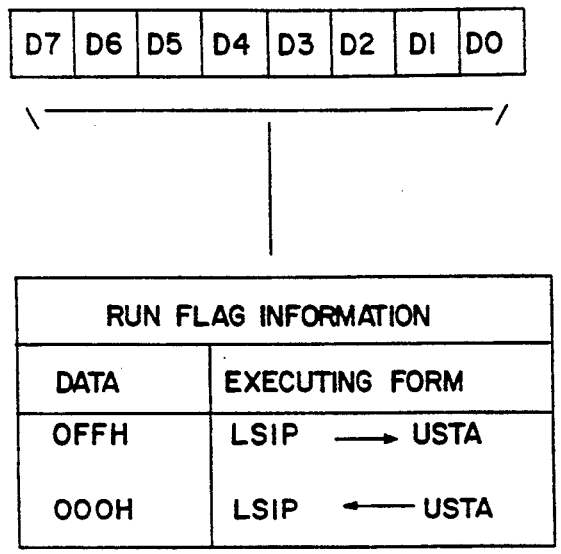

FIG. 6b is a format of run flag meassage, which uses only 1 byte of 2OH address of control region, and being used for the flag region for exhibiting that LSIP 20 and USTA 26 are respectively accessed the common I/O RAM, and LSIP 20 accesses the common I/O RAM within USTA 26 and then writing the FFH data, and USTA 26 accesses the common I/O RAM and then writing the OOH data. Thus, LSIP 20 and USTA 26 convert the flag that other party has exhibited at every time accessing the common I/O RAM each other.

Figure 6C:
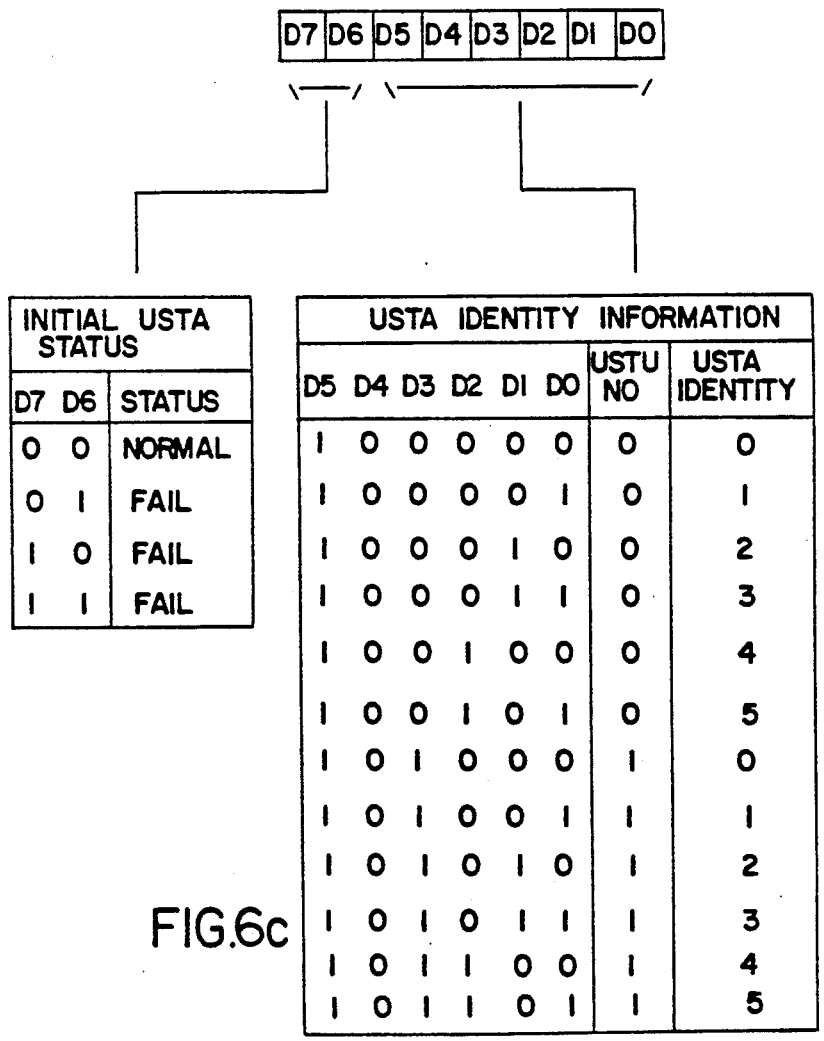

FIG. 6c is a format of initial USTA 26 status and USTA 26 identity, which uses only 1 byte of 22H address of control region, and when USTA 26 operates initially, being used for informing own operational status and identity to LSIP 20. DO–D5 bits exhibit the USTA 26 identity of USTA Ø and USTA 1, which is organized with USTA of maximum by 6 at each USTA Ø and USTU 1. D6 and D7 bits exhibit own operational state when operating initially, which exhibit beginning from normal case, sending block fail, receiving block fail and sending/receiving block fail and the like.

Figure 6D:
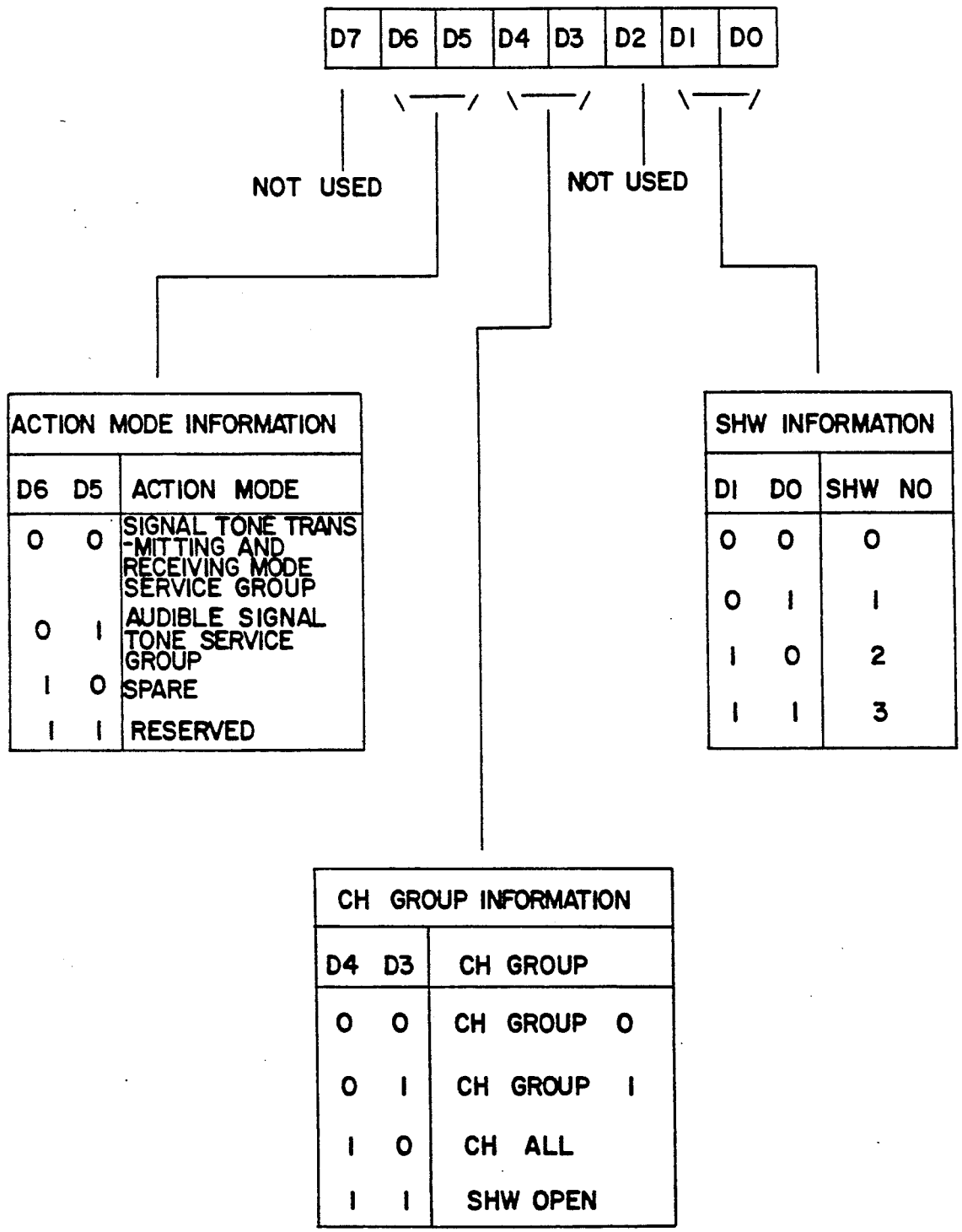

FIG. 6d is a format of service group defining message, which uses only 1 byte of 24H address of control region, and being used for that LSIP designated the operational mode service group information of USTA. D0 and D1 bits are used for selecting one of 4 SHWs, and D3 and D4 bits exbit CH group information composed of 16 CHs, in which 1 SHW is organized by 2 of CH group Ø and CH group 1, and organization of CH group is as following table 1.

TABLE 1

| Function | Organization of CH group | |
|---|---|---|
| | Item | |
| | CH group | CH No. |
| signal tone transmitting and receiving mode service group | 0 | 0, 1, 4, 5, 8, 9, 12, 13, 16, 17, 20, 21, 24, 25, 28, 29, |

TABLE 1-continued

| Function | Organization of CH group | | |
|---|---|---|---|
| | | Item | |
| | CH group | CH No. | |
| audible signal tone transmitting and receiving mode service group | 1;1<br><br>0, 1<br>(selects all) | 2, 3, 6, 7, 10, 11, 14, 15, 18, 19, 22, 23, 26, 27, 30, 31<br>0–31<br>providing audible tone from all CHs | |

Only in case of being designated to signal tone transmitting and receiving mode service group, being selected by CH group unit and being operated by CH unit, and in case of being designated to audible signal tone transmitting mode service group, selecting all of 32 CHs and operating SHW unit, and in case of being designated to standby mode service group, SHW is not selected. D5 and D6 bits are used for exhibiting the operational service group information of USTA.

Figure 6E:
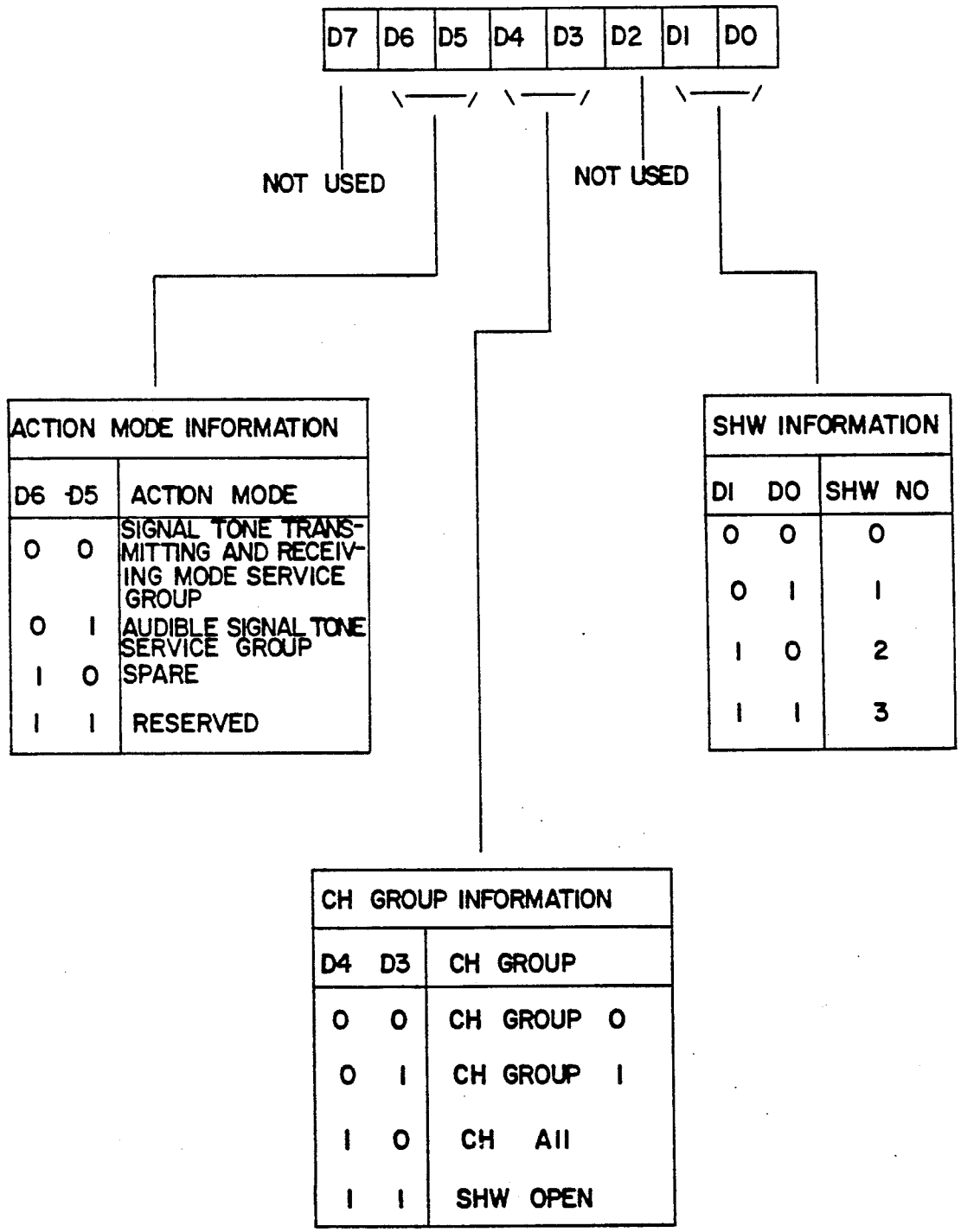

FIG. 6e is a format of operational mode state message of USTA, which uses only 1 byte of 26H address of control region, and USTA 26 sets initially according to the message of FIG. 6d received from LSIP 20 and then informing the operational state information designated for own to LSIP 20, at this moment, organization of message is same as FIG. 6d. And thereafter, LSIP 20 analizes the operational mode state message received from USTA 26, and in case of being set normally, sending the 00H data information to 26H address as confirming message, and in case of being set abnormally, sending the FFH data information to 26H address as confirming message.

Figure 6F:
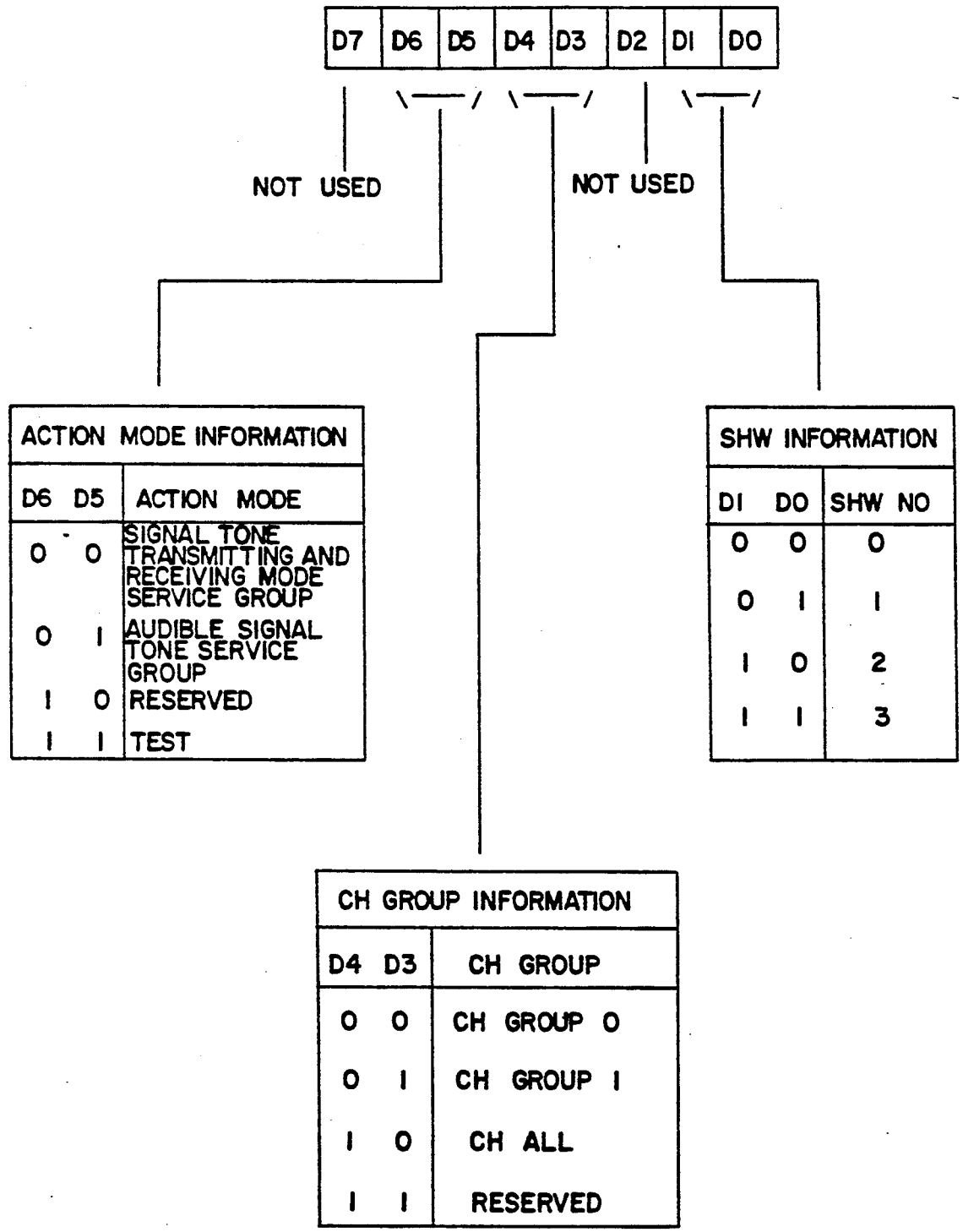

FIG. 6f is a format of managing message of USTA selicted to standby mode service group, which uses only 1 byte of 30H address of control region, and in case of changing the operational service group of USTA during operating for standby mode service group at LSIP, being used for sending the corresponding message to USTA, wherein the organization of using message is same as FIG. 6d in all contents except the service group designating information. In case of being selected to test mode from the service group designating information, executing the test by utilizing the message of FIG. 6a. And, in case of not changing the operational service group of USTA during operating for standby mede service group, writing the FFH data information into 30H address.

Figure 6G:
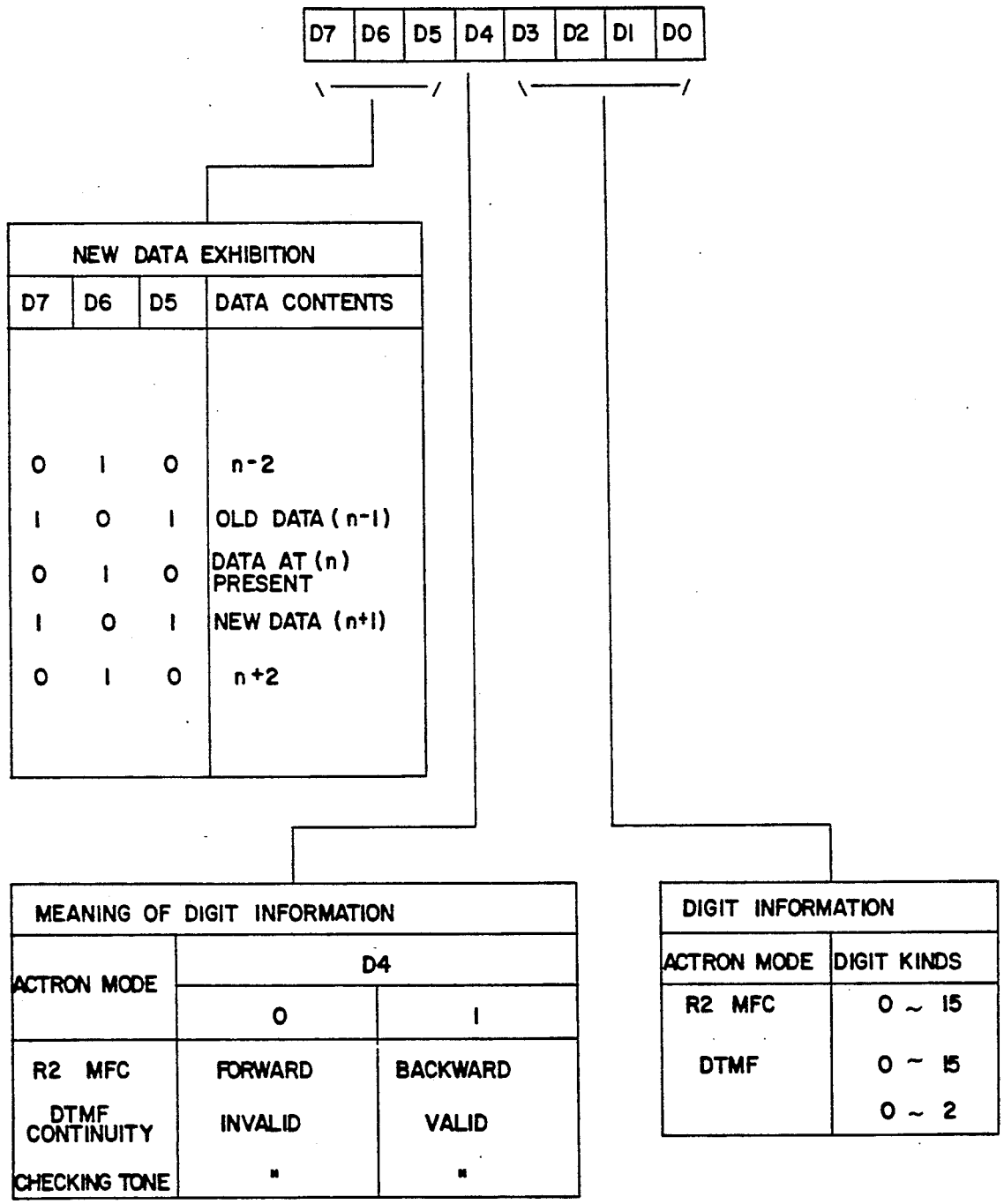

FIG. 6g is a format of message used in receiving region, which is used for that LSIP receives the message detected from USTA designated foi signal tone transmitting and receiving mode service group, and D0–D3 bits exhibit the received digit information, and in case of being R2 MFC signal and DTMF signal, exhibiting the digit information of 0–15, and in case of being continuity checking tone, exhibiting the information of 0–2. D4 bit exhibits the meaning of received information, in case of being R2 MFC signal, exhibiting the direction of forward and backward, and in case of being DTMF signal and continuity signal tone, exhibiting whether or not the validity of invalid and valid is existed. And D5-D7 bits are corresponded only to the DTMF signal, which exhibits whether or not the received digit information is newly updated information, and each bits are toggled one another to "101" and "010" at every time for exhibiting by new digit information.

Figure 7:
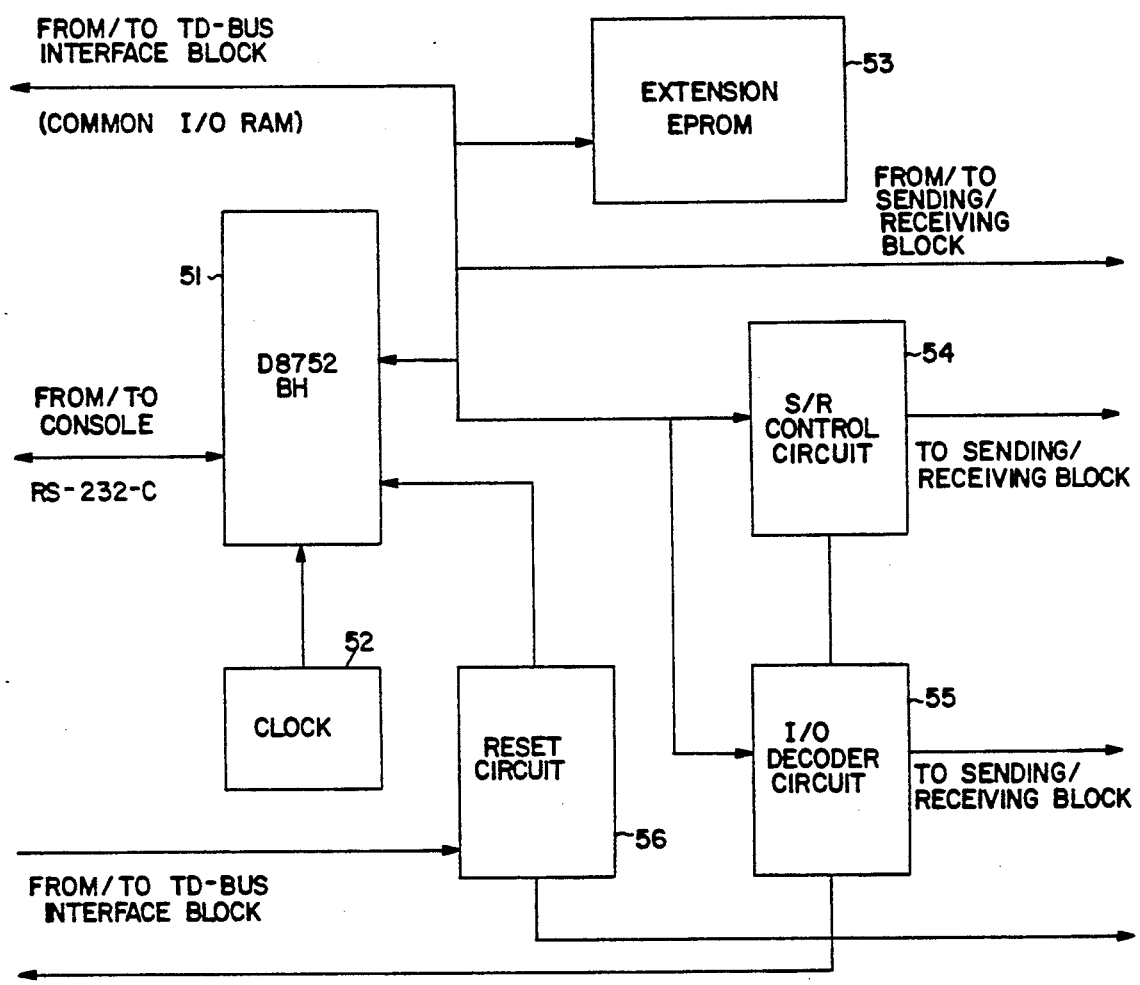
FIG. 7 is a block diagram showing structure of hardware of control block within general signal transmitting and receiving circuit pack.

FIG. 7 is a diagram of hardware structure of control block within USTA 26, of which control block circuit configuration controls the transmitting and receiving function of signal within USTA in response to various kind of message information received from LSIP through TD-bus interface block, and excuting the function for writing to common I/O RAM within TD-bus interface block so as to be able to write from LSIP by confirming the presence or absence of signal after receiving the signal detected from receiving block. In order to control efficiently all signal service functions within such USTA, D8752 BH 51 which is commercially obtainable single chip microcontroller is used, which is operated by clock frequency of 11.0592 MHZ generated by clock 51. D8752 BH is organized with EPROM of 8K×8 bytes, RAM of 256 bytes, timer/counter, full-duplex UART (universal asynchronous receiver and transmitter). EPROM (erasable programmable read only memory (53)) is contained with program capable of monitoring the transmitting and receiving of R2 MFC signal, DTMF signal, DTMF signal and continuity checking signal tone and audible signal tone, and management of standby mode and internal circuit of USTA, and circuit is organized at exterior of microcontroller so as to be able to use the memory of 32K×8 bytes or 64K×8 bytes for the extention of programming capacity. Various circuit within USTA and yes or no of execution of function can be confirmed and supervised with external console through RS-232-C interface, wherein data are transmitted and received by the transmitting speed of 9600 BPS (bit per sec.) Control block is organized with sending/receiving (S/R control circuit (54) for controlling the transmitting and receiving of data and I/O (input/output) decoder circuit (55) for accessing each circuits within USTA, and reset circuit 56 enabling the power-on reset, manual reset, and software reset at LSIP and microcontroller is organized.

Figure 8:
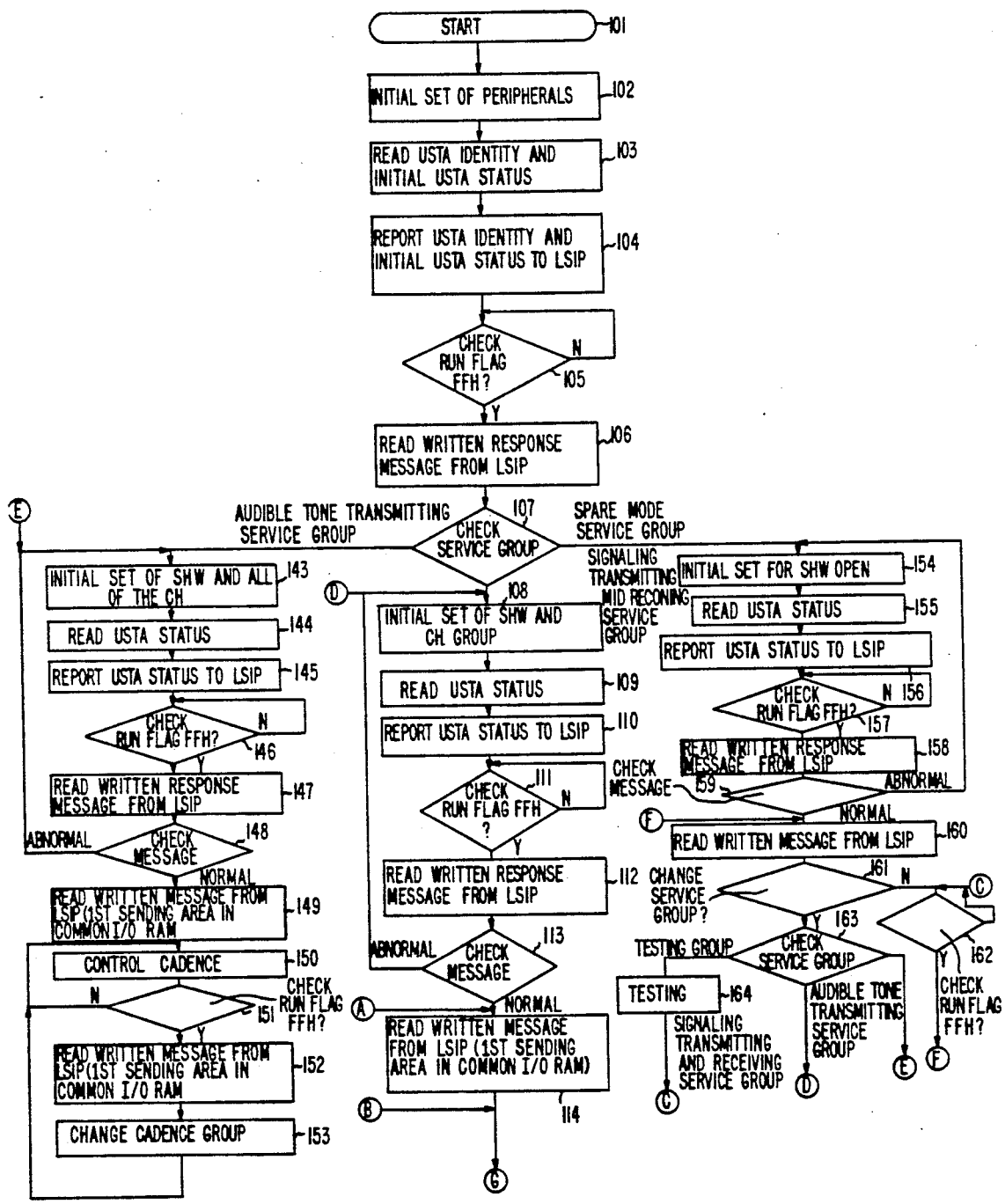
FIGS. 8 and 8a are flow charts for illustrating operational process within general signal transmitting and receiving circuit pack.
Figure 8A:
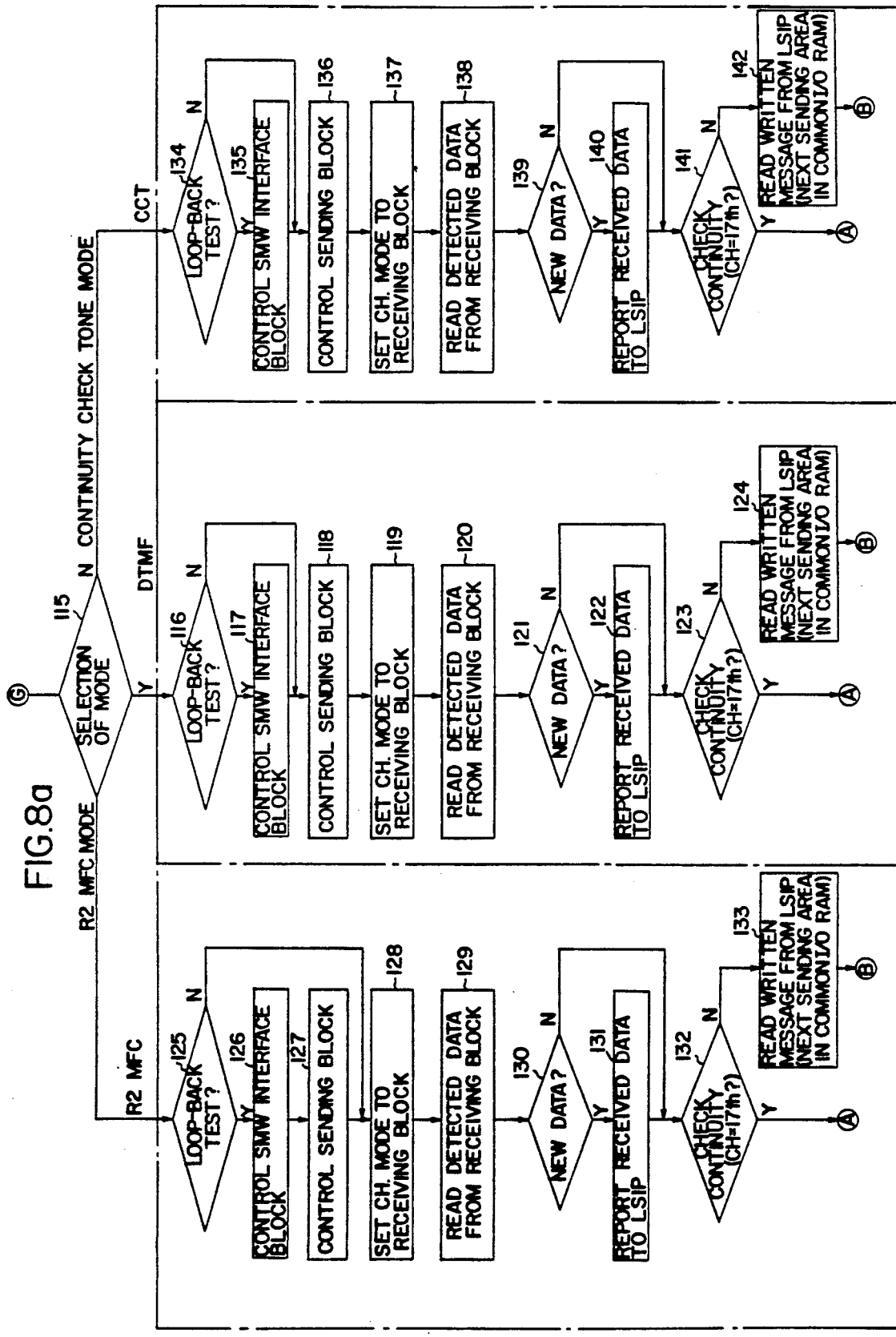

FIG. 8 is a flow chart showing the operational process within USTA, wherein the execution of various functions within USTA is executed under the control of single chip microcontroller of control block. When the power-on reset, manual reset and software reset are executed, operation of USTA is started at step 101, of which executing operational process is as follows. When it is reset, firstly various functions within microcontroller and memory of periphery as well as the circuits of each functional block are initialized at step 102, and in order to read the operational status and own identity within USTA and informing to LSIP at step 103, writing to address 22H of common I/O RAM and clearing the run flag of address 20H of common I/O RAM and then checking the changing status of run flag at step 104. While waiting the changing status of run flag, when the message of address 20H of common I/O RAM becomes FFH at step 105, after reading the service group designating message of USTA sent from LSIP from the address 24H of common I/O RAM at step 106, checking which one is the contents of service group designating message among signal tone transmitting and receiving mode service group, audible signal tone transmitting made group and standby mode service group at step 107.

At this moment, in case when it is designated to the signal tone transmitting and receiving mode service group, after selecting the corresponding SHW and CH group at step 108, reading out the operational status within USTA at step 109, and writing in to the address 26H of common I/O RAM and clearing the run flag of address 20H of common I/O RAM at step 110 and then checking the changing status of run flag. While waiting the changing status of run flag, when message of address 20H of common I/O RAM becomes to FFH at step 111, after reading out the normal or abnormal confirming message of operational status of designated USTA sent from LSIP from address 26H of common I/O RAM at step 112, when received message being judged as abnormal, executing again from the operational process for selecting SHW and CH group with regard to the signal tone transmitting and receiving mode service group at step 113, when received message is judged as normal, reading out the message of address OOH of transmitting region of common I/O RAM sent from LSIP at step 114, and checking which mode it is among R2 MFC signal, DTMF signal and continuity checking tone at step 115.

When it is selected to the functional mode of DTMF signal, checking whether it is a receiving function mode of DTMF signal or a transmitting and receiving lockback test of signal within USTA at step 125, and when it is receiving function mode of DTMF signal, setting the function mode to first mode of receiving block at step 128, and when it is loop-back test, controlling the loop-back circuit of SHW block at step 126, rendering to send the corresponding DTMF signal digit to first CH of sending block at step 127, setting the function mode to first CH of receiving block at step 128, and subsequently reading out DTMF signal digit detected from the receiving block at step 129, and after checking whether or not it is new data at step 130, when it is new data, writing into the address 40H of receiving region of common I/O RAM and informing to LSIP at step 131, checking whether or not the transmitting region of common I/O RAM to read at next is 17th CH, when it is 17th CH, executing the function again from first CH at step 132, when it is not 17th CH, executing second channel being of next channel of presently executed CH at step 133, of which these process are proceeded continuously up to 16th CH. By the way, reading DTMF signal digit detected from receiving block and checking whether or not it is new data at step 130, when it is not new data, checking whether or not the transmitting region of common I/O RAM to read at next is 17th CH, when it is 17th CH, executing the function again from first CH at step 131, when it is not 17th CH, executing second CH being of next CH of presently executed CH at step 133, and these process are proceeded continuously up to 16th CH.

In case when it is selected to R2 MFC signal and continuity checking tone function mode, checking whether it is transmitting function mode of signal or transmitting and receiving loop-back test of signal within USTA at steps 116 and 134, when it is transmitting and receiving mode of signal, rendering to send the corresponding signal digit to first CH of sending block at steps 118 and 136, and setting the function mode to first CH of receiving block at steps 119 and 137, when it is loop-back test, controlling the loop-back circuit of SHW block at steps 117 and 135, and rendering to send to first CH of sendering block at steps 118, 136, subsequently reading out the signal digit detected from receiving block at steps 120 and 138, and all sequence from the process of checking whether or not it is new data are same as the processes which are selected to the function mode of DTMF signal and being processed.

On the other hand, in case of being selected to audible signal tone function mode service group, after selecting the corresponding SHW and all of 32 CHs at step 143, reading out the operational status within USTA at step 144 and writing in to the address 26H of common I/O RAM, and clearing the run flag of the address 20H of common I/O RAM at step 145, and then checking the changing status of run flag. While waiting the changing status of run flag, when the message of address 20H of common I/O RAM becomes to FFH at step 146, reading out the normal or abnormal confirming message of operational stauus of designated USTA sent from LSIP from the address 26H of common I/O RAM, after clearing the run flag of address 20H of common I/O RAM at step 147, when the received message is judged as abnormal, executing again from the operational process for selecting SHW and all of 32 CHs with regard to the audible signal tone transmitting mode service group at step 148, when the received message is judged as normal, reading the message of address OOH of transmitting region of common I/O RAM sent from LSIP at step 149, and sending the audible signal tone in accordance with the corresponding cadence group at step 150. While waiting the changing status of run flag during sending the audible signal tone, when the message of address 20H of common I/O RAM becomes to FFH at step 151, reading the message of address OOH of transmitting region of common I/O RAM sent from LSIP at step 152, sending the audible signal tone in accordance with the corresponding cadence group at step 153. Such process is continuously executed during sending the audible signal tone.

In case when it is selected to the standby mode service group, without selecting the corresponding SHW at step 154, reading out the operational status within USTA at step 155, and writing in to the address 26H of common I/O RAM, and clearing the run flag of address 20H of common I/O RAM at step 156, and then checking the changing status of run flag. While waiting the changing status of run flag, when the message of address 20H of common I/O RAM becomes to FFH at step 157, reading out the normal or abnormal corfirming message of operational status of designated USTA sent from LSIP from the address 26H of common I/O RAM, and clearing the run flag of address 20H of common I/O RAM at step 158, and then when the received message is judged as abnormal, executing again from the operational process of not selecting the SHW with respect to the standby mode service group at step 159, when the received message is judged as normal, reading out the message of address 30H of common I/O RAM control region sent from LSIP at step 160, and checking whether it exhibits changing or not of service group at step 161, in case when the change of service group is not arisen, while waiting the changing status of run flag, when the message of address 20H of common I/O RAM becomes to FFH at step 162, reading out the message of address 30H of control region of common I/O RAM sent from LSIP at step 160, and checking whether it is designated to test mode, or certain service group among the signal tone transmitting and receiving mode service group and audible signal tone transmitting mode service group at step 161, in case when the change of service group is arisen, checking whether it is designated to test mode, or certain service group among the signal tone transmitting and receiving mode service group and audible signal tone transmitting mode service group at step 163. At this moment, in case when it is set to test mode, after executing the test as same as loop-back testing process at signal tone transmitting mode service group, clearing the run flag of address 20H of common I/O RAM and waiting the changing status of run flag at step 164. On the other hand, in case when it is designated to the signal tone transmitting and receiving function mode service group and audible signal tone transmitting mode service group, the operation is executed respectively to the corresponding service group, and the executing processes are same as the process as described previously.

Figure 9:
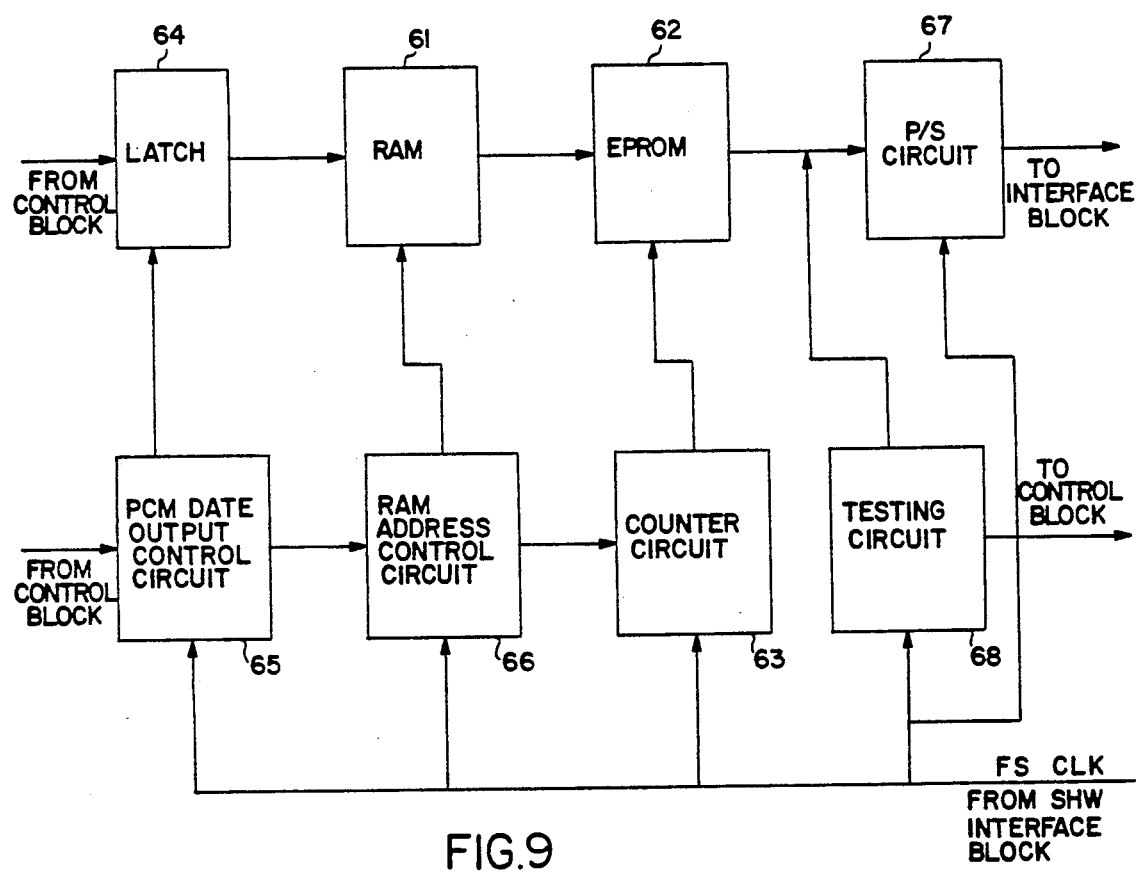
FIG. 9 is a block diagram showing structure of hardware of sending block within general signal transmitting and receiving circuit pack.

FIG. 9 is a diagram of hardware structure of sending block within USTA, of which circuit of sending block is organized such that CH information and signal digit information stored to common I/O RAM are received to control from LSIP through the control block, and signal designated by CH is sent to TSU 11 through SHW interface by utilizing ROM (read only memory) look-up table method. And, CH information and digit information required at sending block are respectively 1 byte, and sending block is consituted with 2K×8B SRAM (static radnom access memory) 61 for storing temporarily this data, 64K×8 bytes EPROM 62 storing the sampled signal data such as R2 MFC signal, DTMF signal and continuity checking tone, and audible signal tone made into PCM, and perippheral circuit such as counter 63 latch 64, PCM data output control circuit 65, RAM address control circuit 66, and P/S circuit 67. Particularly, testing circuit 68 for confirming yes or no of normal operation of sending block is included whereby checking whether or not the data outputted from EPROM 62 storing PCM data are normally sent.

Figure 10:
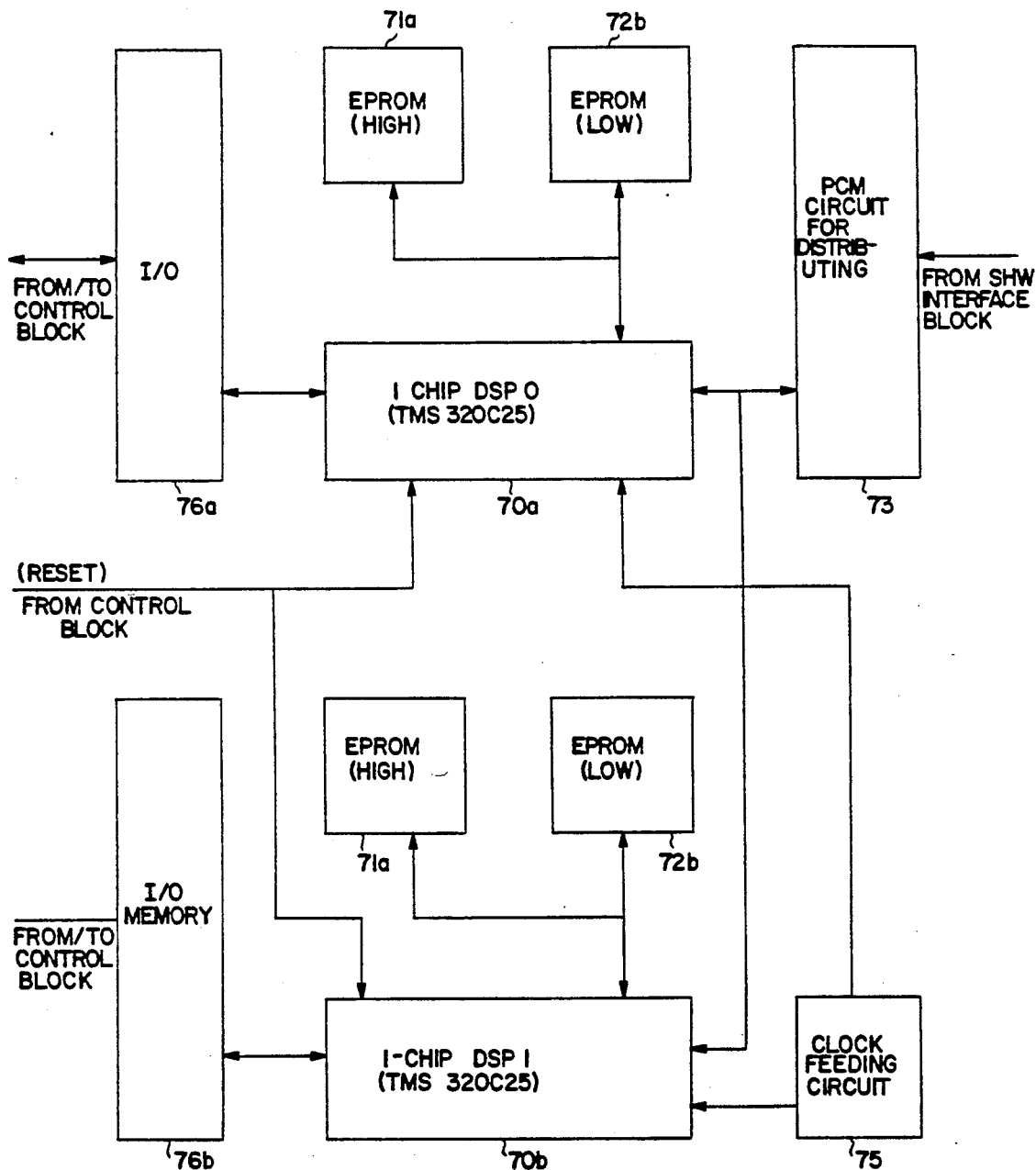
FIG. 10 is a block diagram showing structure of hardware of receiving block within general signal transmitting and receiving circuit pack.

FIG. 10 is a diagram of hardware structure of receiving block within USTA, wherein signal detecting algorithm is realized with firmware by applying DSP (digital signal processor) chip 70 which is commercially obtainable and being easy in high speed operational process, because function mode corresponding to R2 MFC signal, DTMF signal and continuity checking tone having receiving function of signal among various signal service function in response to the control of control block with respect to the USTA designated to signal tone transmitting and receiving mode service group is selected, and serial data of PCM signal information inputted from TSU 11 through SHW interface block is received, and thereafter real time process should be executed for detection of corresponding signal. Signal information detected at DSP chip 70 is informed to LSIP through the control block. DSP chip 70 used here is comercially obtainable TMS 320, C25, which is possible to detect by 8 CHs with respect to each of R2 MFC signal, DTMF signal and continuity checking tone per DSP chip 70, even if R2 MFC signal, DTMF signal and continuity checking tone are mixed by CH and being inputted, being possible to detect at any time, and two DSP chips 70a, 70b per USTA are organized whereby signal service capacity of 16 CHs can be processed. Major circuit for constituting the receiving block is made to be able to extend to 8K×8 bits EPROM 71, 72 although two 4K×8 bits EPROM 71, 72 contained with signal detecting algorithm by each chip organize high byte 71 and low byte 72. Except these, there are circuit for distributing PCM 73 input data to DSP chip 70, reset circuit 74 of DSP chip 70 and clock feeding circuit 75 for providing 40 MHZ to DSP chip 70, and message information is exchanged by 1 byte unit for sending the detected digit information to the control block and for receiving the functional information from the control block, and I/O memory 76 is organized for these with TTL logic which is unilateral 4×4 register file, while it is organized with 4 bytes memory in order to receive the functional information from the control block, and being organized with 8 bytes memory 76 in order to transmit the digit information detected from the receiving block to the control block.

Figure 11:
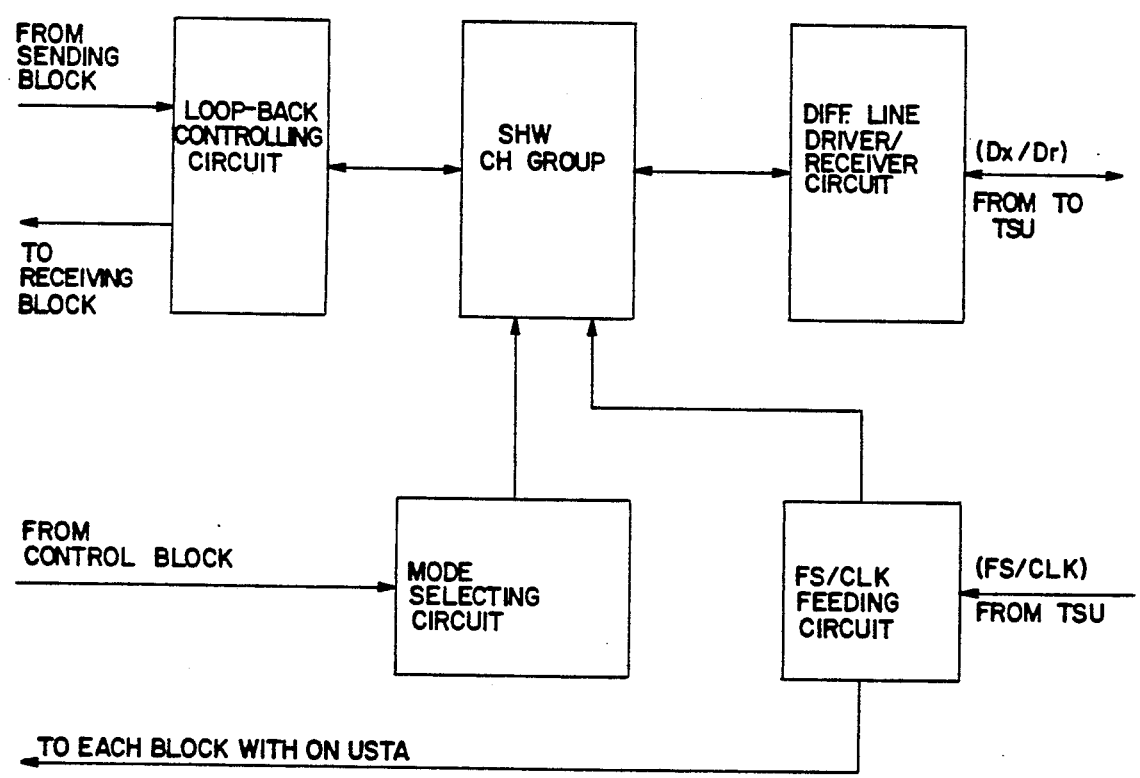
FIG. 11 is a block diagram showing structure of hardware of SHW interface block within general signal transmitting and receiving circuit pack.

FIG. 11 is a diagram of hardware structure of SHW interface block within USTA, wherein four serial SHWs are connected for the transmitting and receiving of PCM data between USTA and TSU as SHW interface block circuit configuration, in which each SHW is organized by Dx (transmitted data) line used for sending the data to TSU and Dr (received data) line for receiving the data from TSU. In which a circuit for selecting the corresponding one SHW among 4 SHWs and CH group 81 is contained therein in response to mode selection circuit (80) according to the control of the control block, and a circuit for receiving the frequency of FS (frame synchronization) of 8 KHZ and CLK (clock) of 2.048 MHZ 82 from TSU, and feeding to each function circuit block within USTA, is also contained therein. A circuit is organized such that CH group is contained with two per one SHW, which is corresponded to this in case of executing to function as signal tone transmitting mode service group, and whole of one SHW is selected in case of executing to function as audible signal tone transmitting mode service group, and even one SHW is not selected in case of servicing as standby mode.

Therefore, maximum 6 USTA is packaged respectively to USTA 0 and USTU 1, consequently two of four SHWs are used by USTA designated to signal tone transmitting and receiving mode service group, one is used by USTA designated to audible signal tone transmitting mode service group, and remaining one SHW is used as spare. Except these, a circuit for looping-back the PCM signal data transmitted by CH from sending block 83 to receiving block within USTA is contained, and differential line driver/receiver circuit 84 is organized for the stable SHW interface with TSU.

In conventional electronic switching system, the signal service unit is either divided by signal service kind or being organized by various kinds of circuit packs or having a point that control method is complicated, in contrast with these, according to the present invention, signal service units organized respectively by one kind of general use circuit packs are applied and being organized by centralizing to one, whereby control method of signal service unit is simplified, occupying area that the signal service units occupy within switching system is reduced, manufacturing cost upon manufacturing is decreased whereby productivity and economic property are enhanced, and maintenance and repairing as well as management and administration are simplified whereby efficiency is maximized. Further, there is effect that signal service capacity is automatically optimized even without requiring to reckon separate signal service capacity by signal service kinds. Furthermore, since it is organized by one kind of general usue circuit packs, and addition of signal service function and extension of capacity are easy, it is not necessary to designate the mounting location of circuit pack within signal service unit, and since it is realized with structure for using of large capacity circuit pack objecting all circuit packs within signal service unit, load divding by service function and doubling are combined whereby reliability is improved. It can be utilized to all of telephone exchanges for local, tandem and toll without changing of structure of signal service unit, in case of designing the telephone exchange, since only general use circuit pack numbers of required capacity are changed in response to the signal traffic without adding change of other circuits whereby corresponding signal service functions can be executed, provision of effective signal service is enabled, and it is possible to confront with versatility for the trend that switching system becomes to larger capacity and containing capacity becomes to divided module in future.

What is claimed is:

1. In a time-division electronic switching system including a time switch unit TSU comprising a double switch network, a time switch processor TSP for controlling said TSU, an analog subscriber interface unit ASIU for connecting a subscriber, an analog subscriber interface processor ASIP for controlling said ASIU, a digital trunk interface unit DTIU for connecting a relay line between telephone exchanges, a digital trunk interface processor DTIP for controlling said DTIU, a fault interface unit FIU for collecting and processing errors for maintenance and repair within a telephone exchange, a fault interface processor FIP for controlling said FIU, a universal signaling transceiver unit USTU for executing various signal service functions required to process calling, a local service interface processor LSIP for controlling said USTU, and an accessing switching processor ASP for controlling and managing all of said processors through an inter-processor control bus IPCB to control various functions within the electronic switching system, a universal signaling service unit characterized in that:

control of said LSIP is directly received through a telephony device-bus TD-bus composed of 1 byte units serially transmitted at a transmitting speed of 2.5 Mbps (mega bits per second), and pulse code modulation PCM signal data of a corresponding signal is transmitted and received by said TSU through a subhighway SHW interface;

a fault state generated in a case when a function fails at said USTU is forwarded to said FIU through an alarm bus;

a service function for requiring a real time process, such as a function for generating a signal service function with respect to an R2 MFC multi-frequency compelled signal, a DTMF dual tone multi-frequency signal, a continuity checking tone, an audible signal tone and a sending to said TSU, in order to generalize circuit packs consisting of said USTU to one kind, and a function for detecting a signal received from said TSU, is made common whereby one universal signaling transceiver assembly USTA is designed;

a circuit is constituted such that an interface with said TD-bus and a pulse code modulation PCM signal SHW can be executed for receiving control from said LSIP and for executing, transmitting and receiving of a signal associated with said TSU within said USTA, and service of a transmitting and receiving function with respect to the R2 MFC signal, the DTMF signal, the continuity checking tone and the audible signal tone can be executed in a single universal signaling transceiver assembly;

a signal service function in said USTA is divided in response to a feature of a signal, providing a form of service and executing a process of service by a signal service type, into a signal tone transmitting and receiving mode service group for providing the R2 MFC signal, the DTMF signal and the continuity checking tone requiring transmitting and receiving of a signal, and an audible signal tone transmitting service group for providing an audible signal tone requiring only a transmitting function of a signal, whereby a standby mode service group performs a standby function when spare circuit packs have been packaged so that continuous provision of a signal service is provided;

said USTU is associated with a structure comprising respective signaling transceiver assemblies conforming to a function mode of three groups according to said USTA included with function mode service groups of three groups being used;

said USTU is divided into two units USTU 0 and USTU 1 for extension of signal service capacity and improvement in reliability whereby respective divided units connect a doubled TSU and a separate pulse code modulation PCM signal SHW, and executes a service function by receiving a control from an exclusive service interface processor among two service interface processors and by being connected with two service interface processors and said TD-bus;

said respective divided units are internally organized by signaling transceiver assemblies having functions respectively designated for the signal tone transmitting and receiving mode service group, the audible signal tone transmitting mode service group and the standby mode service group by receiving control from the exclusive service interface processor in normal operation time;

said USTA designated to the signal tone transmitting and receiving mode service group is organized by a structure so that an entire signal service capacity is divided to both sides of the respected divided units whereby a load is dispersed;

said USTA designated to the audible signal tone transmitting mode service group is singly organized to the respective divided units by doubling for directly transferring a response of a switching system to a subscriber by utilizing a signal tone; and USTA designated to standby mode service group is organized by N+1 redundancy structure to respective USTU 0 and USTU 1 where N is the required number of USTAs in each said USTU which are performing signal service functions and 1 is the number of said USTAs for standby function.

2. Universal signaling service unit according to claim 1, wherein said USTA for organizing USTU is organized with five blocks according to the functional form of which functional blocks are designed with TD-bus interface block, control block, sending block, receiving block and SHW interface block, in which TD-bus interface block is connected with two TD-buses and executing the function of communicating with LSIP by selecting one of two TD-buses, control block is block for executing the function for controlling effectively all signal service functions within USTA, which controls the transmitting and receiving function of signal within USTA by reading out various information received from LSIP from TD-bus interface block, sending block executes function for generating PCM signal data designated by each CH (channel) in response to the signal information received from the control block and sending to SHW interface block, receiving block executes function for selecting the functional mode corresponding to R2 MFC signal, DTMF signal and continuity checking tone having the receiving function among various signal functions in response to the control of control block and receiving and detecting the serial data of PCM signal information inputted from TSU though SHW interface block and then informing to the control block, and SHW interface block is connected with SHW used for transmitting and receiving of PCM signal data with TSU, and transmitting the signal data sent from sending block to TSU by selecting the corresponding SHW among several SHWs according to the control of the control block, and executing the function for sending the signal data received from TSU to receiving block, at the same time, executing the function for looping-back the PCM data transmitted by CH from the sending block to receiving block within USTA by receiving the control of the control block.

3. Universal signaling service unit according to claim 2, wherein hardware structure of said TD-bus interface within USTA is organized with circuit for selecting one TD-bus, among two TD-buses connected respectively to a local service interface processor (A) LSIP (A) and a local service interface processor (B) LSIP (B) by utilizing TBSEL (TD-bus selection) signal sent from both LSIPs; and converting (S/P conversion) various data information inputted from LSIP in serial form into parallel form and writing into common I/O RAM (input-/output random access memory) made of dual ports whereby being made possible to utilize within USTA; and converting the data information processed into parallel form within USTA into serial form and sending to LSIP; at the same time having BSEL (board selection) circuit used for the communication with LSIP and a RDY (ready) signal generating circuit; and differential line driver/receiver circuit is used for the stable interface of TD-bus; and including status register capable of knowing the operational status within USTA and collecting the fault and alarm status generated from respective blocks within USTA, wherein, as a memory map of common I/O RAM within USTA, commericial AMD 2131-3 dual port RAM of 1024 bytes is used, which is organized with transmitting region, control region, receiving region and a reserved region, and wherein the transmitting region, the control region and the receiving region are divided by a 32-bytes unit, and wherein the transmitting region is a region for sending a message from said LSIP to said USTA, the control region is region used for exchanging various control messages between said LSIP and said USTA, and the receiving region is region used for reading the result executed at said USTA from said LSIP.

4. A universal signaling service unit operated by exchanging a plurality of messages through a telephony device-bus a TD-bus between a local service interface processor LSIP and a universal signaling transreceiver assembly USTA, wherein, a first message is used in a transmitting region, which is used for sending various control information messages by said LSIP to said USTA, in which D0-D3 bits exhibit information to be sent, and which exhibits a digit of 0-15 in a case of an MFC multi-frequency compelled signal and a DTMF dual tone multi-frequency signal, and exhibits information of 0-2 in a case of the continuity checking tone, and exhibits a type of cadence in three kinds in a case where an audible signal tone exists, wherein changing of a cadence is executed by said USTA, and only 1 byte of an OOH address is utilized, and in a case when D4-D7 bits are designated to signal a tone transmitting and receiving service mode group, exhibiting the continuity checking tone by a channel CH, and in a case when a bit D7 is set, a loopback test within said USTA is indicated;

a second message comprising a run flag message, which uses only 1 byte of an address 20H of a control region, is used as a flag region for exhibiting that said LSIP and said USTA have accessed respectively a common I/O RAM, and writing FFH data after said LSIP has accessed a common I/O RAM within said USTA, and writing 00H data after said USTA has accessed a common I/O RAM, and thus said LSIP and said USTA convert a flag that a party has exhibited every time an accessing of the common I/O RAM occurs;

a third message is a message concerning initial USTA status and identity, which uses only 1 byte of an address 22H of a control region, and is used for informing operational status and identity to said LSIP when said USTA operates initially, and D0-D5 bits exhibit a USTA identity of respective divided units, in which said USTA of a maximum of 6 are organized for each divided unit, and D6 and CD7 bits exhibit an operational state upon operating initially, which exhibits from a normal case to a sending block failure, a receiving block failure and a sending/receiving block failure;

a fourth message is a service group designating message which uses only 1 byte of an address 24H of a control region, and is used for designating operational mode service group information of said USTA by said LSIP, and D0 and D1 bits are used for selecting one of 4 SHW interfaces and D3 and D4 exhibit CH channel group information organized by 16 channels, wherein 1 SHW subhighway interface is organized by two of channel groups 0,1 and organization of a CH group corresponds to a table;

wherein when designated to signal a tone transmitting and receiving mode service group, a selection is made by a channel CH group unit and operates by a channel CH unit, and when designated to an audible signal tone mode service group, selecting all of 32 channels and operating by an SHW interface, and when designated to a standby mode service group, not selecting the SHW interface, and D5 and D6 bits are used for exhibiting an operational service group of said USTA;

a fifth message is an operational mode status message of said USTA, which uses only 1 byte of an address 26H of a control region, and said USTA executes initial setting in accordance with the fourth message received from said LSIP and then informs operational status information designated to said LSIP, whereby organization of a message is equivalent to that of the fourth message, and then said LSIP analyzes an operational mode status message received from said USTA, whereby when the status message is set normally, 00H data information is sent to address 26H as a confirming message, and when set abnormally, FFH data information is sent to address 26H as a confirming message;

a sixth message is an administrative message of said USTA selected to a standby mode service group which uses only 1 byte of an address 30H of a control region, which is used for sending a corresponding message to said USTA when changing the operational service group of said USTA in operating as a standby mode service group of said USTA in operating as a standby mode service group at said LSIP, in which organization of a using message is equivalent to that of the fourth message except for service group designating information, and when selected to a test mode from service group designating information, executing a test by utilizing the first message, and whereby when not changing an operational service group of said USTA, in operating as a standby mode service group, FFH data is written to address 30H;

a seventh message is a message used in a receiving region which is used for receiving a message detected from said USTA that said LSIP is designated to signal tone transmitting and receiving service group, and D0-D3 bits exhibit received digit information, and in the case of an R2 MFC signal and a DTMF signal, exhibiting digit information of 0-15, and in the case of an audible signal tone, exhibiting information 0-2, and D4 bits exhibits the meaning of received information, and in the case of the R2 MFC signal, exhibiting a direction of forward and backward, and in the case of the DTMF signal and continuing checking tone, exhibiting presence or absence of validity as invalid and valid, and D5-D7 bits correspond only to DTMF signal, which exhibits whether or not received digit information is newly updated information, in which each bit is toggled one to values of "101" and 010 at every time of exhibiting new digit information.

5. Universal signaling service unit according to claim 2, wherein hardware structure of said control block within USTA is organized such that:

transmitting and receiving function within USTA is controlled in response to the various message informations received from LSIP through TD-bus interface, and controlling to send the corresponding signal from sending block, and executing the function for receiving the signal detected from receiving block and then confirming the presence or absence of signal so that being able to read at LSIP, and writing in to common I/O RAM within TD-bus interface block;

D8752 BH which is commercially obtainable single chip microcontroller is used for controlling effectively such all signal service functions within USTA, which is operated with clock frequency of 11.0592 MHZ, and D8752 BH is organized with EPROM of $8^K \times 8$ bytes, RAM of 256 bytes, timer/counter, and full duplex UART (universal asynchronous receiver and transmitter);

EPROM (erasable programmable read only memory) is contained with program capable of transmitting the R2 MFC signal, DTMF signal and continuity checking tone and transmitting of audible signal tone, and administrating the standby mode and monitoring the interior circuit of USTA, and being organized with circuit so as to be able to use the memory of $32^K \times 8$ bytes or $64^K \times 8$ bytes at the exterior of microcontroller, for the extension of program capacity;

yes or no of normal operation of various circuits and execution of function with USTA can be confirmed and supervised with exterior console through R3-232-C interface, in which data are transmitted and received by transferring speed of 9600 BPS (bits per second); and control block is organized with sending/receiving (S/R) control circuit for controlling the transmitting and receiving of data, I/O (input/output) decoder circuit for accessing respective circuit within USTA, and reset circuit for enabling the power-on reset, manual reset and software reset at LSIP and single chip macrocontroller.

6. A universal signaling service unit according to claim 1, wherein an operational process within said USTA is organized with a sequence such that:

at first, when a power-on reset, a manual reset and a software reset are set, operation of said USTA is started, when it is reset, initially initializing various functions, memory of periphery and various functional block circuits within a microcontroller, and writing into an address 22H of a common I/O RAM in order to read out an operational status and identity within said USTA and informing said LSIP, and clearing a run flag of an address 20H of a common I/O RAM and then checking a changing status of the run flag;

while waiting for the changing status of the run flag, when the message of address 20H of a common I/O RAM becomes FFH, reading out a service group designating message of said USTA sent from said LSIP from an address 24H of a common I/O RAM, and then checking which one among a signal tone transmitting and receiving service group, an audible signal tone transmitting and receiving service group, an audible signal tone transmitting mode group and a standby mode service group includes contents of the service group designating message;

in the case of designation to the signal tone transmitting and receiving mode service group, selecting a corresponding interface SHW and channel CH group, and then reading operational status within said USTA and writing into address 26H of a common I/O RAM, and clearing a run flag of address 20H of a common I/O RAM, and then checking the changing status of the run flag;

while awaiting the changing status of run flag, when a message of address 20H of a common I/O RAM becomes FFH, reading a confirming message of normal or abnormal of an operational status of said USTA designated and sent from said LSIP from address 26H of a common I/O RAM, and then when a received message is judged to be abnormal, executing again from an operational process for selecting the SHW and CH group with respect to the signal tone transmitting and recieving mode service group, and when a received message is judged to be normal, reading address 00H of a transmitting region of a common I/O RAM sent from LSIP, and checking that which a function mode among the R2 MFC signal, the DTMF signal and the continuity checking tone is thereof;

in the case of being selected to a functional mode of the DTMF signal, checking whether it is a receiving function mode of the DTMF signal or a transmitting and receiving loop-back test of a signal within said USTA, and when it is a functional mode of the DTMF signal, setting the functional mode to a first channel CH of a receiving block, and when it is a loop-back test, controlling a loop-back circuit of a SHW block, and sending a corresponding DTMF signal digit to the first channel CH of a sending block, and setting the functional mode to the first channel CH of the receiving block, successively reading the DTMF signal digit detected from the receiving block, and checking whether or not the DTMF signal unit is new data, and if the DTMF signal digit is new data, writing into address 40H of a receiving region of a common I/O RAM and informing said LSIP, and checking whether or not a transmitting region of a common I/O RAM to be read next is a 17th channel CH, and when it is a 17th channel CH, executing again from the first channel CH, and when it is not a 17th channel CH, executing a second CH which a successive channel CH with respect to a presently executed CH, such process proceeding continuously up to a 16th channel CH;

after reading the DTMF signal digit detected from the receiving block and checking whether or not the DTMF signal digit is new data, if new data, checking whether or not a transmitting region of a common I/O RAM to be read next is a 17th channel CH, and when it is 17th CH, executing again from the first channel CH, and when it is not the 17th channel CH, executing the second channel CH which is the next channel CH with respect to a presently executed channel CH, such process proceeding continuously up to the 16th channel CH;

when the R2 MFC signal and continuity checking tone function mode is selected, checking whether a transmitting and receiving functional mode of a signal or a transmitting and receiving loop-back test of a signal is within said USTA, and when the transmitting and receiving functional mode of a signal is acknowledged, sending a corresponding signal digit to the first channel CH of the sending block, and setting a functional mode to the first channel CH of the receiving block, and when the loop-back test is acknowledged, controlling a loop-back circuit of the SHW block, and inducing sending to the first channel CH of the sending block, and then reading a signal digit detected from the receiving block, and all sequences from a process for checking whether or not new data, is equivalent to a process that is selected to a functional mode of the DTMF signal and being processed;

when a selection to the audible signal tone service group is made, after selecting a corresponding interface SHW and all of 32 channels CHs, reading an operational status within said USTA and writing into address 26H of a common I/O RAM, and clearing a run flag of address 20H of a common I/O RAM, and then checking the changing status of a run flag;

while waiting the changing status of a run flag, when a message of address 20H of a common I/O RAM becomes FFH, reading a normal or abnormal confirming message of an operational status of a designated USTA sent from said LSIP from address 26H of a common I/O RAM, and clearing a run flag of address 20H of a common I/O RAM, and then when a received message is judged to be abnormal, being executed again from an operational process for selecting all of 32 channels CHs and interface SHW with respect to the audible signal tone transmitting mode service group, and when a received message is judged to be normal, reading a message of address 00H of a transmitting region of a common I/O RAM sent from said LSIP, and sending an audible signal tone according to a corresponding cadence group;

while waiting changing status of a run flag during sending of the audible signal tone, when the message of address 20H of a common I/O RAM becomes FFH, reading the message of address 00H of transmitting region of a common I/O RAM sent from said LSIP, and sending the audible signal tone according to a corresponding cadence group, such process being executed continuously during sending of the audible signal tone;

when selected to the standby mode service group, corresponding interface SHW is not selected, and reading an operational status within said USTA and writing to address 26H of a common I/O RAM, and clearing the run flag of address 20H of a common I/O RAM, and then checking the changing status of the run flag;

while waiting the changing status of the run flag, when a message of address 20H of a common I/O RAM becomes FFH, reading a normal or abnormal confirming message of operational status of a designated USTA sent from said LSIP from address 26H of a common I/O RAM, and clearing the run flag of address 20H of a common I/O RAM, and then when a received message is judged to be abnormal, executing again from an operational process of not selecting interface SHW with respect to the standby mode service group, and when a received message is judged to be normal, reading a message of address 30H of a common I/O RAM control region sent from said LSIP, and checking exhibits of yes or no of change of a service group, when change of a service group has not arisen, while waiting the changing status of a run flag, and when a message of address 20H of a common I/O RAM becomes FFH, reading a message of address 30H of a control region of a common I/O RAM sent from said LSIP, and checking whether it is a test mode or being designated to a certain service group among the signal transmitting and receiving mode service group and the audible signal tone transmitting mode service group, and when a change of a service group has arisen, checking whether a test mode or designation to certain service group among the signal tone transmitting and receiving mode service group and audible signal tone transmitting mode service group;

when set to a tst mode, after executing a test equivalent to a loop-back testing process at the signal tone transmitting and receiving mode service group, and then clearing a run flag of address 20H of a common I/O RAM and waiting the changing status of a run flag;

in a case of designation to the signal tone transmitting and receiving functional mode service group, an operation is executed by a respective correspnding service group, and an executing process equivalent to a previously mentioned process.

7. Universal signaling service unit according to claim 2, wherein hardware structure of said sending blocking is organized such that:

CH information and signal digit information stored to common I/O RAM from LSIP sends the signal designated by respective CH according to the control through the control block by utilizing ROM (read only memory) look-up table method through SHW interface to TSU;

CH information and signal digit information requiring at sending block are 1 byte respectively;

sending block is organized by 2K×8 bytes SRAM (static randon access memory) for storing these data temporarily, 64K×8 bytes EPROM storing the sampled PCM signal data of audible signal tone, R2 MFC signal, DTMF signal and continuity checking tone, and peripheral circuit of counter; and particularly, testing circuit for confirming the normal or abnormal operation of sending block is included, and checking whether or not the data outputted from EPROM storing the PCM data is normally sent.

8. Universal signaling service unit according to claim 2 wherein hardware structure of said receiving block within USTA is organized such that:

signal detecting algorithm is realized to firmware by using commercially obtainable DSP (digital signal processor) chip being easy with high speed operational process because real time process should be executed in detecting the corresponding signal after receiving the serial data of PCM signal information inputted from TSU through SHW interface block by selecting the functional mode corresponded to R2 MFC signal, DTMF signal and contrnuity checking tone among various signal service functions in response to the control of control block;

signal information detected at DSP chip is informed to LSIP through the control block, and DSP chip used at here is commercially obtainable TMS 320 C25, which can detect by 8 CHs to each of R2 MFC signal, DTMF signal and continuity checking tone per DSP chip, and any time can be detected even if R2 MFC signal, DTNF signal and continuity checking tone are mixed by CH and inputted, and since two DSP chips per USTA are opganized, signal service capacity of 16 CHs can be processed;

two 4K×8 bytes EPROM containing signal detecting algorithm by respective chip organize high byte and low byte in major circuit for organizing the receiving block, which are made to be able to extend to $8^K \times 8$ bytes EPROM;

circuit for distributing the PCM input data DSP chip, reset circuit of DSP chip, and clock feeding circuit for providing 40 MHZ to DSP chip, is included, and exchanging the message information by 1 byte unit for sending the detected digit information and receiving the function information from the control block, for which I/O memory circuit is organized by TTL logic which is unilateral 4×4 register file which is organized by the memory of 4 bytes for receiving the function information from the control block, and being organized by the memory of 8 bytes for transferring the digit information detected from the receiving block to the control block.

9. Universal signaling service unit according to claim 2 wherein hardware structure of said SHW interface block within USTA is organized such that:

four serial SHWs are connected for the transmitting of PCM data between USTA and TSU, wherein respective SHW is organized by Dx (transmitted data) line used for sending the data to TSU and Dr (received data) line used for receiving the data from TSU;

circuit for selecting CH group and corresponding one SHW among four SHWs is included, and circuit for receiving the CLK (clock) frequency of 2.048 MHz and FS (frame synchronozation) of 8 KHz from TSU and feeding to respective functional blocks within TSU;

circuit is organized such that the CH group is included with two per one SHW, which is corresponded to this CH group in case of the functional execution by the signal transmitting and receiving mode service group, whole of one SHW is selected in case of the functional execution by the audible signal tone transmitting mode service group and so as even one SHW is not selected in case of being serviced by standby mode; therefore maximum 6 of USTA are respectively packaged to USTU ∅ and USTU 1, accordingly USTA designated to the signal tone transmitting and receiving mode service group uses two of four SHWs, one is used by USTA designated to the audible signal tone service group, and remaining one SHW is used as spare; and except these SHWs, circuit for looping-back the PCM signal data transmitted by CH from the sending block to the receiving block within USTA for the own loop-back test of signal data is included, and differential line driver/receiver circuit for the stable SHW interface with TSU is organized.

* * * * *